US011858724B2

(12) United States Patent
Fletcher et al.

(10) Patent No.: US 11,858,724 B2
(45) Date of Patent: Jan. 2, 2024

(54) MODULAR PORTABLE STORAGE CONTAINER SYSTEM

(71) Applicant: QT-System LLC, Fenton, MI (US)

(72) Inventors: Stuart Fletcher, Linden, MI (US); Scott Owen, Columbiaville, MI (US)

(73) Assignee: QT-System LLC, Fenton, MI (US)

( * ) Notice: Subject to any disclaimer, the term of this patent is extended or adjusted under 35 U.S.C. 154(b) by 26 days.

(21) Appl. No.: 17/717,604

(22) Filed: Apr. 11, 2022

(65) Prior Publication Data

US 2023/0062245 A1    Mar. 2, 2023

Related U.S. Application Data

(63) Continuation-in-part of application No. 17/410,412, filed on Aug. 24, 2021.

(51) Int. Cl.
| B65D 90/20 | (2006.01) |
| B65D 88/12 | (2006.01) |
| B65D 88/00 | (2006.01) |

(52) U.S. Cl.
CPC ........... *B65D 88/005* (2013.01); *B65D 88/12* (2013.01); *B65D 90/20* (2013.01)

(58) Field of Classification Search
CPC ....... B65D 88/005; B65D 88/12; B65D 90/02
USPC ............................................. 280/244; 220/8
See application file for complete search history.

(56) References Cited

U.S. PATENT DOCUMENTS

| 4,182,530 | A | * | 1/1980 | Hodge | .................... E05C 3/048 |
| | | | | | 220/228 |
| 4,726,486 | A | | 2/1988 | Masuda | |
| 8,985,365 | B2 | * | 3/2015 | Chuang | ............... B65D 88/005 |
| | | | | | 220/4.03 |
| 2006/0032850 | A1 | * | 2/2006 | Theriot | ................ B65D 88/005 |
| | | | | | 220/1.5 |
| 2009/0078700 | A1 | | 3/2009 | Boivin | |
| 2013/0284730 | A1 | | 10/2013 | Kohlgrüber | |
| 2014/0190963 | A1 | * | 7/2014 | Skeid | ..................... B65D 88/12 |
| | | | | | 220/1.5 |

(Continued)

FOREIGN PATENT DOCUMENTS

| CN | 104325939 B | * | 5/2016 |
| GB | 2008064 A | * | 5/1979 |

(Continued)

*Primary Examiner* — J. Gregory Pickett
*Assistant Examiner* — Niki M Eloshway
(74) *Attorney, Agent, or Firm* — Vivacqua Crane PLLC

(57) ABSTRACT

A modular portable storage container system includes a storage container having first and second sections. The first section defines a first partial volume of storage space and the second section defines a second partial volume of storage space. The system further includes a lock mechanism with a lock arm, lock handle, and pivot shaft defining an axis of rotation. The lock arm and handle are fixed for common rotation with the pivot shaft. The arm extends radially outward from the pivot shaft to a roller assembly. A lock track is disposed within the second section and extends from a fluted open portion to a closed end, with a continuous track portion disposed therebetween. The first and second sections are movable between at least closed and open positions. In the closed position, the roller assembly engages with the lock track and retains the first section in contact with the second portion.

19 Claims, 12 Drawing Sheets

(56) References Cited

U.S. PATENT DOCUMENTS

| | | |
|---|---|---|
| 2015/0375929 A1 | 12/2015 | Hamilton et al. |
| 2019/0152691 A1 | 5/2019 | Wegener |
| 2021/0188532 A1* | 6/2021 | Trout .................. B65D 88/005 |
| 2023/0150759 A1* | 5/2023 | Vreugdenhil ...... B65D 90/0086 |
| | | 220/1.5 |

FOREIGN PATENT DOCUMENTS

| | | | |
|---|---|---|---|
| WO | WO-9511608 A1 | * | 5/1995 |
| WO | WO-2016113588 A1 | * | 7/2016 |
| WO | WO-2020209876 A1 | * | 10/2020 |

* cited by examiner

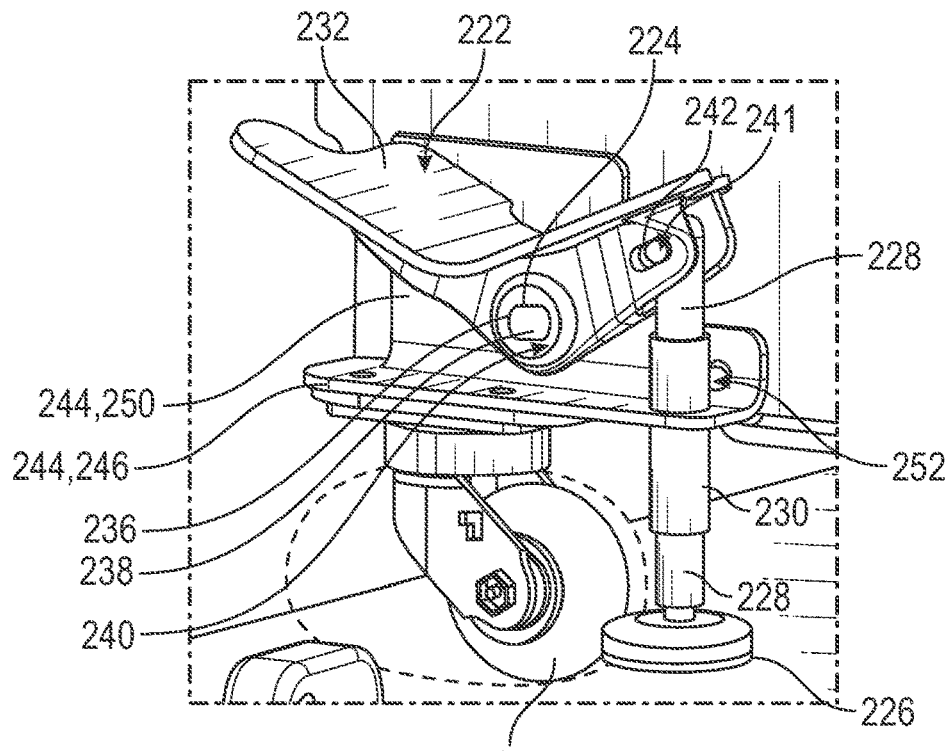

MODULAR PORTABLE STORAGE CONTAINER SYSTEM

CROSS-REFERENCE TO RELATED APPLICATIONS

The present application is a continuation-in-part of U.S. application Ser. No. 17/410,412 filed on Aug. 24, 2021. The disclosure of the above application is incorporated herein by reference in its entirety.

INTRODUCTION

The present disclosure relates to containers, and more specifically to containers for storage and transport of a wide variety of objects in various applications.

Vehicle users often use cargo compartments within their vehicles to move cargo, packages, and objects more generally, from place to place. Typically, a vehicle user will manually load a cargo compartment within their vehicle with those cargo, packages, and other objects. In some instances, mechanical or automated devices may assist in such loading and/or unloading of the vehicle cargo compartments. While current systems and methods for loading and unloading vehicle cargo compartments certainly continue to work, there is a need in the art for a simplified system that reduces the number of times that a user must interact with the cargo before, during, and after transit to a use or delivery location. Likewise, there is a need in the art for a scalable, high portability storage system that can be safely and securely used in a wide variety of fields of endeavor, including but not limited to private, industrial, and warehouse applications. Further, there is a need in the art for a scalable high-portability storage system that can be manufactured at relatively low cost, with low complexity.

SUMMARY

According to an aspect of the present disclosure a modular portable storage container system includes a first container section defining a first partial volume of storage space, and a second container section defining a second partial volume of storage space. Each of the first and second container sections has a structural frame. The system further includes a blocking frame sized and shaped to fit within a vehicle cargo compartment. The system further includes a latch mechanism selectively retaining the structural frame of each of the first container section and the second container section in contact with the blocking frame. A brake mechanism affixed to each of the first container section and the second container section is selectively engageable to prevent movement of the structural frame of each of the first container section and the second container section relative to a floor on which each of the first container section and the second container section rests. A plurality of casters are affixed to a bottom surface of each of the first and second container sections, the plurality of casters allowing the first and second container sections to roll over the floor.

In another aspect of the present disclosure brake mechanism further includes a brake pedal, and a brake pivot shaft. The brake pedal is fixedly mounted to the brake pivot shaft via a receiving aperture. Each of the brake pivot shaft and the receiving aperture has corresponding keyed features preventing rotation of the brake pivot shaft relative to the brake pedal. The brake pivot shaft is rotatably disposed through a portion of the first container section and the second container section. The brake mechanism further includes a sleeve rigidly affixed to each of the first container section and the second container section. The sleeve is vertically oriented, offset, and orthogonal to the brake pivot shaft. An actuator rod is slidably retained within the sleeve. The actuator rod extends from a rod pin to a brake pad. The rod pin is slidably and rotatably disposed within an aperture in the brake pedal, and the brake pad extends in a downward direction. The brake pedal is selectively actuatable between an engaged position and a disengaged position. In the engaged position, the brake pedal rotates about the brake pivot shaft such that the actuator rod moves downward through the sleeve and the brake pad fixedly engages with the floor on which each of the first container section and the second container section rests.

In another aspect of the present disclosure the brake mechanism further includes an aperture formed through the sleeve and facing inwardly towards the first container section and the second container section. A detent is formed in the actuator rod and is selectively alignable with the aperture in the sleeve. The brake mechanism further includes a spring-loaded retainer having a rod-shaped element and a retainer spring. The spring-loaded retainer is fixedly positioned on each of the first container section and the second container section and extends horizontally towards and passes through the aperture to selectively engage with the detent. The retainer spring biases the rod-shaped element towards the aperture in the sleeve so that when the brake pedal is in the engaged position, the rod-shaped element engages with the detent and prevents vertical movement of the actuator rod within the sleeve.

In another aspect of the present disclosure the first and second container sections are movable between at least an unlatched position and a latched position. In the unlatched position, the first and second container sections are freely movable relative to the blocking frame and in the latched position the structural frames of each of the first and second container sections are retained in contact with the blocking frame via the latch mechanism.

In another aspect of the present disclosure the blocking frame further includes a front frame portion, and a rear frame portion connected to the front frame portion by a plurality of longitudinal bars. The longitudinal bars have a substantially planar and corrugated cross-sectional shape. One or more blocking members form a narrow door frame in the front frame portion. The one or more blocking members prevent longitudinal movement of the first and second container sections within a vehicle while allowing a user to pass into a space between the first and second container sections when the first and second container sections are in the latched position. A mounting plate selectively rigidly connects the blocking frame to the floor. One or more of the longitudinal bars is connected to the front frame portion and the rear frame portion by a connector plate. The rear frame portion defines a wide door frame, the wide door frame being larger than the narrow door frame. The wide door frame being sized to allow passage of the first and second container sections when the first and second container sections are in the unlatched position. The rear frame portion prevents longitudinal movement of the first and second container sections within a vehicle when the first and second containers sections are in the latched position.

In another aspect of the present disclosure at least a portion of the blocking frame is rotated at an angle of between about 5° and about 30° relative to other portions of the blocking frame to improve clearance between the first and second container sections and the blocking frame during movement of the first and second container sections.

In another aspect of the present disclosure the structural frame of each of the first and second container sections further includes a front section and a rear section connected to the front section by one or more longitudinal members. When the first and second container sections are in the latched position, the front section and the rear section nest within and substantially against the front frame portion and the rear frame portion, respectively. The longitudinal members have cross sectional shape that defines a channel sized to fit around and engage with the longitudinal bars of the blocking frame.

In another aspect of the present disclosure the latch mechanism further includes a spring latch, a latch receiver; and a retaining hook. One of the spring latch and the latch receiver is disposed on the blocking frame while the other of the spring latch and the latch receiver is disposed on the structural frames of each of the first container section and/or the second container section such that the spring latch and the latch receiver are disposed opposite one another and engage with one another when the first container section and/or the second container section are in the latched position. The hook engages with an outer vertical member of the structural frame to partially rotatably retain the structural frame.

In another aspect of the present disclosure the spring latch further includes a latch mount rigidly disposed on the blocking frame. The spring latch further includes a latch tongue, a latch handle, and a latch rod extending from the latch tongue to the latch handle. A latch spring is disposed within the latch mount and biases the latch tongue inwardly towards the first container section and the second container section. The latch handle is adapted to be grasped by a user's hand and selectively manipulated to retract the latch rod against the latch spring, thereby retracting the latch tongue into the latch mount.

In another aspect of the present disclosure the retaining hook is rigidly disposed on the blocking frame longitudinally opposite the spring latch. When the retaining hook engages with and retains the outer vertical member of the structural frame and the spring latch is engaged with the latch receiver, the structural frame is immobilized and held rigidly within the blocking frame in an orientation substantially parallel to an orientation of the blocking frame.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 10A is a partial perspective rear view of a portion the brake mechanism of the modular portable storage container system of FIGS. 9A and 9B according to an aspect of the present disclosure;

FIG. 10B is a partial perspective side view of a portion of the brake mechanism of FIG. 10A depicting a spring-loaded retainer according to an aspect of the present disclosure;

DETAILED DESCRIPTION

The following description is merely exemplary in nature and is not intended to limit the present disclosure, application, or uses.

In the text that follows, including in the claims and specification, certain elements are designated as "first", "second", "third", "fourth", and so forth. These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

Figure 1:
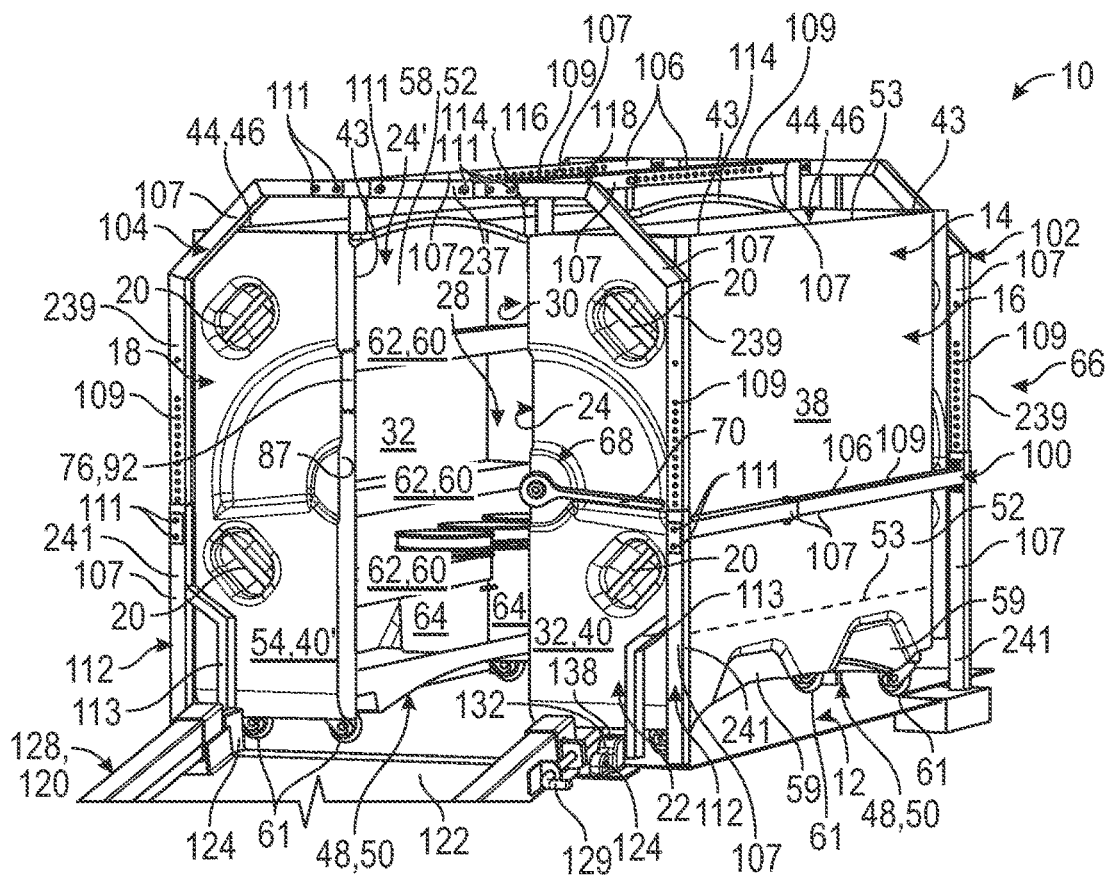
FIG. 1 is a partial perspective rear view of a modular portable storage container system according to an aspect of the present disclosure.
Figure 2:
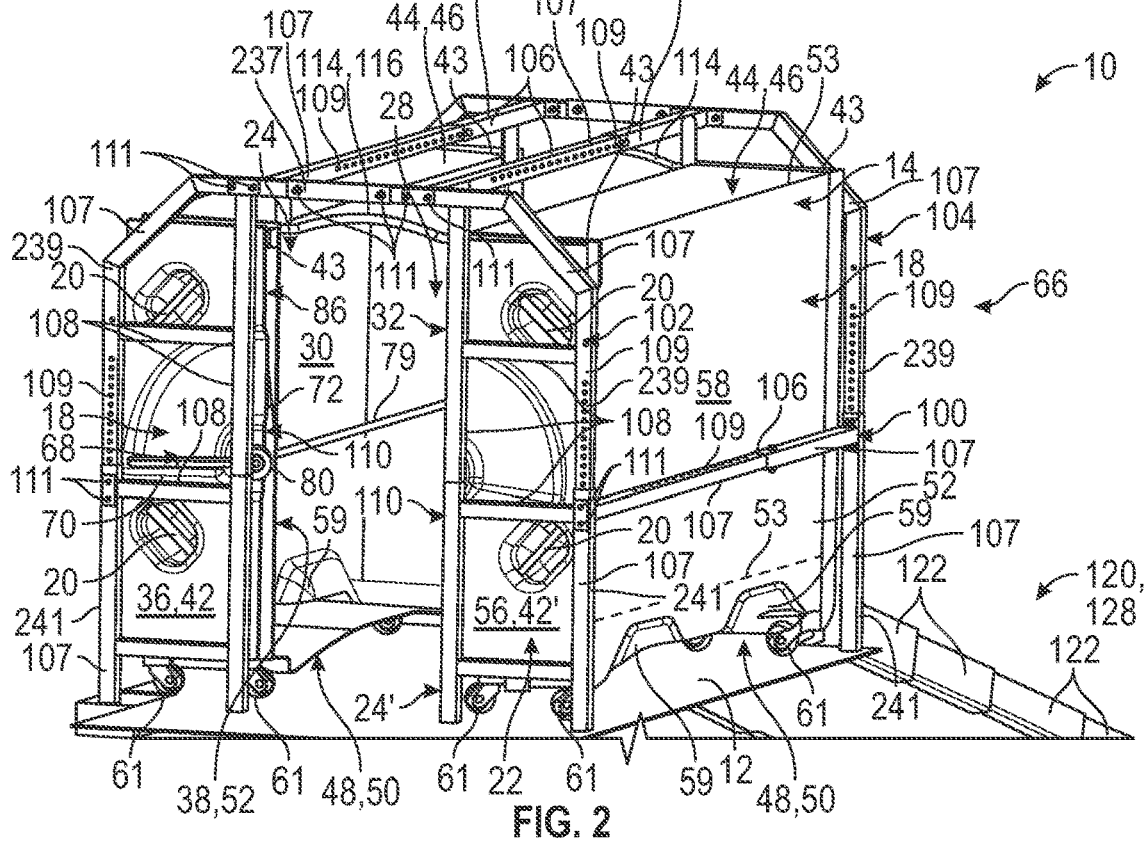
FIG. 2 is a partial perspective front view of the modular portable storage container system of FIG. 1 according to an aspect of the present disclosure.
Figure 3:
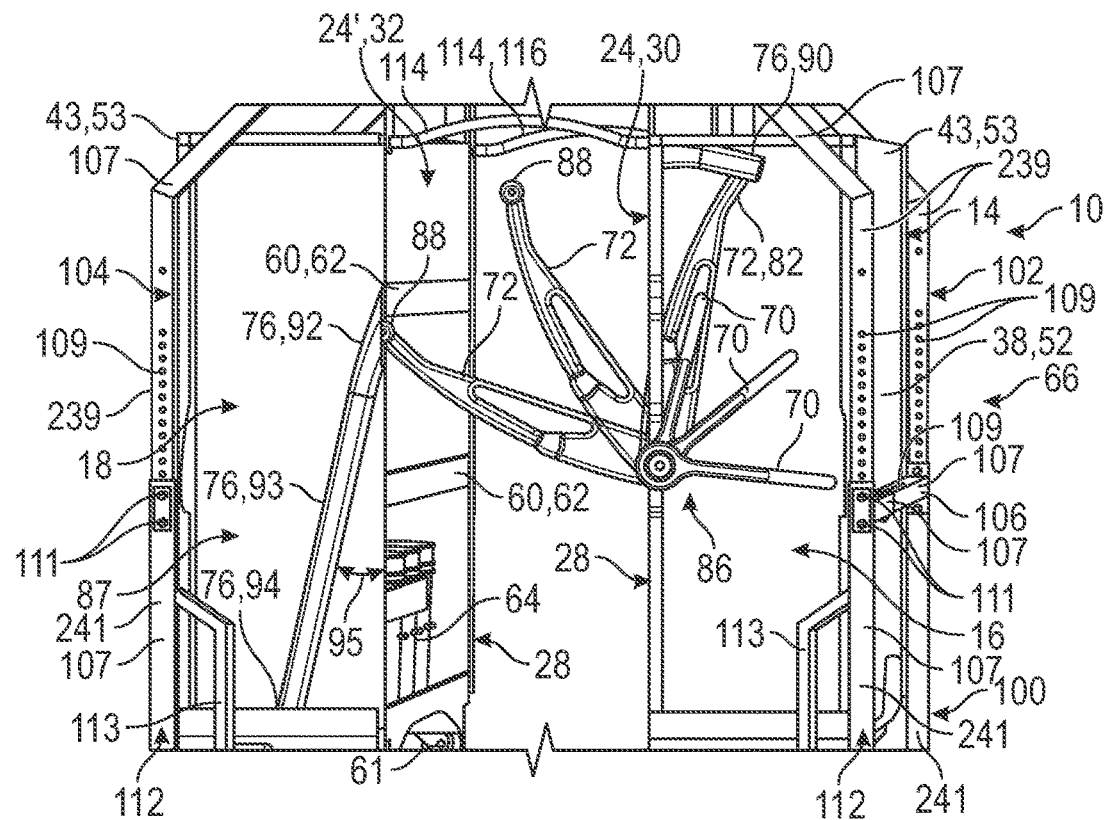
FIG. 3 is a partial perspective rear cutaway view of a portion of the modular portable storage container system of FIG. 1 in an open position and showing articulation of a lock arm according to an aspect of the present disclosure.
Figure 4:
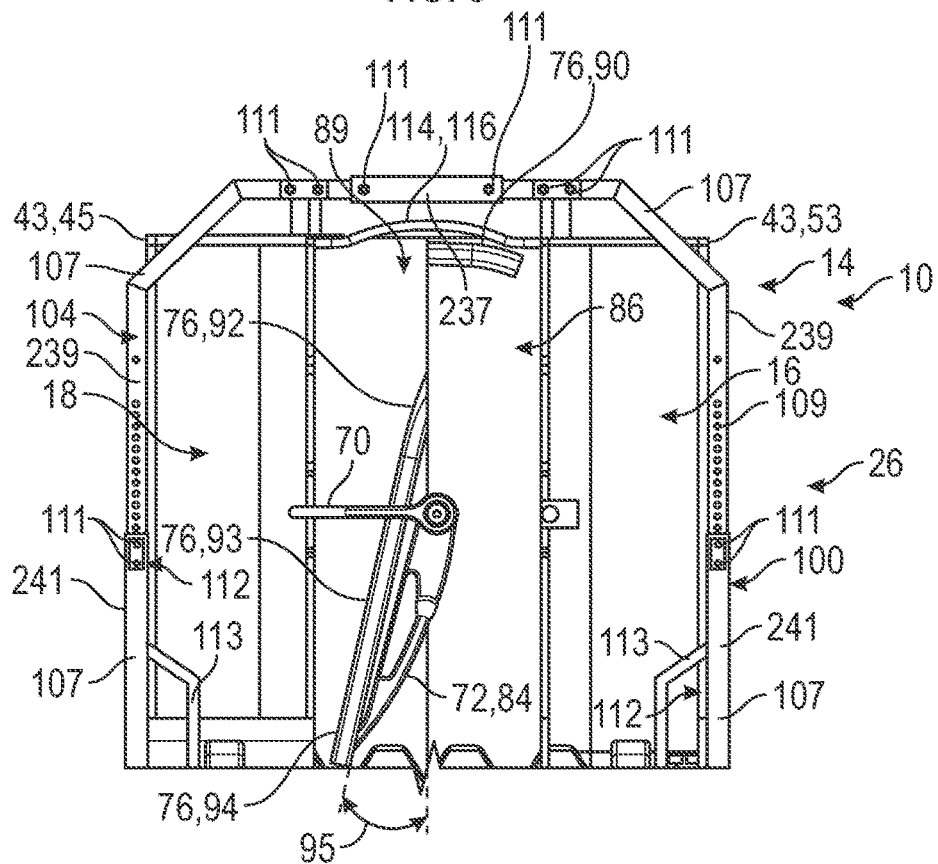
FIG. 4 is a partial rear cutaway view of a portion of the modular portable storage container system of FIG. 3 in a closed position and showing the lock arm in a locked position according to an aspect of the present disclosure.
Figure 5:
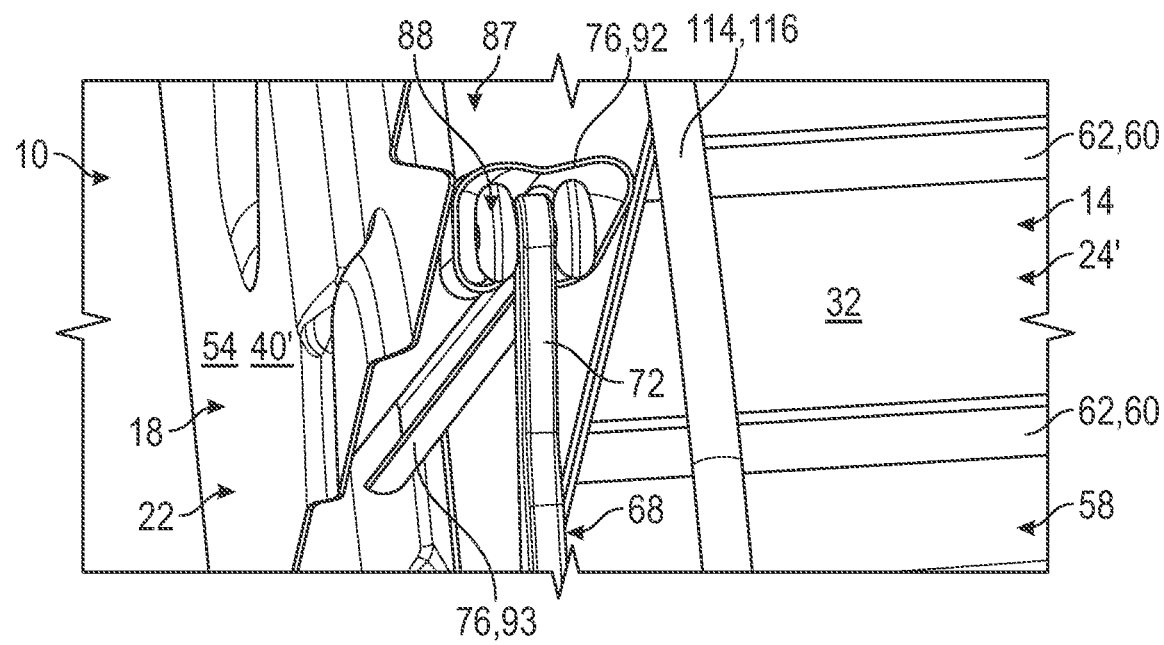
FIG. 5 is a partial perspective cutaway view of the modular portable storage container system of FIG. 3 showing a fluted portion of a lock track and the lock arm partially engaged therewith according to an aspect of the present disclosure.
Figure 6:
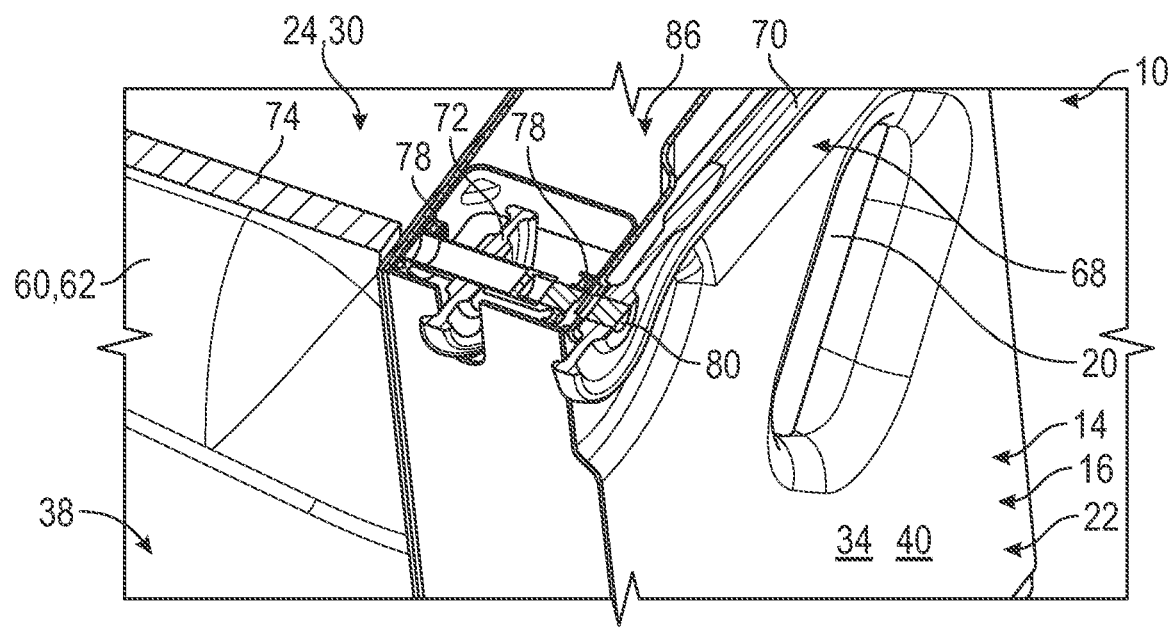
FIG. 6 is a partial perspective cutaway view of the modular portable storage container system of FIG. 3 showing a cross section of a portion of a lock handle and pivot shaft according to an aspect of the present disclosure.

Referring to FIGS. 1 and 2, a modular portable storage container system 10 is shown. The system 10 is sized and shaped to fit within a vehicle (not specifically shown). The vehicle may be any of a wide variety of vehicles such as cars, vans, trucks, busses, motor homes, semi trucks and/or trailers, trains, aircraft, spacecraft, watercraft, or any other such vehicle without departing from the scope or intent of the present disclosure. More specifically, the system 10 is sized and shaped to fit within a vehicle cargo compartment (not specifically shown except for cargo floor 12). The system 10 is portable and can be moved or manipulated from place to place by one or more people, or by automated means. The system 10 includes a modular storage container 14 composed of at least a first container section 16 and a second container section 18.

In the context of the modular portable storage container system 10 and vehicle cargo compartments into which the system 10 is designed to fit, the terms "forward", "rear", "inner", "inwardly", "outer", "outwardly", "above", and "below" are terms used relative to the orientation of a vehicle as shown in the drawings of the present application. Thus, "forward" refers to a direction toward a front of a vehicle, "rearward" refers to a direction toward a rear of a vehicle, "inner" and "inwardly" refers to a direction towards the interior of a vehicle, and "outer" and "outwardly" refers to a direction towards the exterior of a vehicle, "below" refers to a direction towards the bottom of the vehicle, and "above" refers to a direction towards a top of the vehicle.

The terms "top", "overtop", "bottom", "side" and "above" are terms used relative to the orientation of storage container 14 as shown in the drawings of the present application. Thus, while the orientation of the storage container 14 may change with respect to a given use, these terms are intended to still apply relative to the orientation of the components of the storage container 14 as shown in the drawings.

The storage container 14 may be used in a variety of different applications without departing from the scope or intent of the present disclosure. For example, the storage container 14 may be used in a warehouse or factory setting to move items from one area of the warehouse or factory to another. The storage container 14 may likewise be used in delivery applications in which the storage container 14 is loaded with items at one location. Subsequently, the storage container 14 is moved into the vehicle cargo compartment, secured therein, and then transported by the vehicle to another location where the storage container 14 or the contents thereof are delivered to the new location.

In order to move or manipulate the storage container 14 from place to place, including into and out of vehicle cargo compartments, one or more handles 20 are built into an exterior surface 22 of the storage container 14. The handles 20 may be moulded unitarily with the storage container 14, or the handles 20 may be affixed to the storage container 14 by known means such as mechanical fasteners including bolts, nuts, rivets, screws, interference fittings, and the like, and/or thermal or chemical fastening means such as welding, braising, glues, or the like. The handles 20 shown in FIGS. 1 and 2 are angled with respect to the horizontal to provide an ergonomic hand-position or grip for a person or people moving the storage container 14, however, it should be appreciated that the angles shown are merely exemplary and not intended to be limiting. In some examples, the handles 20 may be completely horizontal, completely vertical or angled anywhere in between. Likewise, the handles 20 shown are linear, but could also be curved, angular, or the like without departing from the scope or intent of the present disclosure. In some examples, in which the storage container 14 is moved from place to place solely by automated means, the handles 20 may adapted as a keyway for a robotic or otherwise automated assembly to movably attach to and manipulate or move the storage container 14 from location to location. Additional handles 20, keyways, or other such features may be disposed at locations other than those shown in the figures without departing from the scope or intent of the present disclosure.

As shown in FIGS. 1 through 4, the first and second container sections 16, 18 define rectilinear prisms each having an open side 24. Put differently, the first and second container sections 16, 18 of FIGS. 1 and 2 are shaped generally like open-sided rectangular boxes. In several aspects, the first and second container sections 16, 18 are substantially identical to one another. In some examples, the first and second container sections 16, 18 define mirror images of one another. The open side 24 of the first container section 16 and the open side 24' of the second container section face each other so that when the first and second container sections 16, 18 are placed into contact with one another in a closed position 26, the first and second container sections 16, 18 surround, enclose, and define a full volume 28 of storage space. That is, the first container section 16 defines a first partial volume 30 of storage space, and the second container section 18 defines a second partial volume 32 of storage space, the first and second partial volumes 30, 32 of storage space combining to define the full volume 28 of storage space.

Each of the first and second container sections 16, 18 may be made of a wide variety of different materials, including metals, alloys, plastics, vinyls, composite materials, and the like. In one particular example, the first and second container sections 16, 18 are made in a vacuum formed injection molding process out of a plastic material such as polytetrafluoroethylene (PTFE), or the like. In another specific example in which the modular storage container system 10 is used in food or medical applications, the materials of the first and second container sections 16, 18 and many or all of their components are composed of known food safe or medical grade materials. The material of the first and second container sections 16, 18 are at least partially solid, hollow, corrugated or a honeycomb material, or the like without departing from the scope or intent of the present disclosure.

The first and second container sections 16, 18 of some examples are made of several distinct modular components. In one example, the first container section 16 is formed of a modular first end portion 34, a modular second end portion 36, and a modular first wall portion 38. The first end portion 34 defines a rear end 40 of the first container section 16, while the second end portion 36 defines a front end 42 of the first container section 16, with the modular first wall portion 38 extending therebetween. That is, the first and second end portions 34, 36 are substantially planar and parallel to one another, while the first wall portion 38 is orthogonal to each of the first and second end portions 34, 36. The first end portion 34 contacts the first wall portion 38 at a connection surface 43 where fastening means are employed to secure the first end portion 34 to the first wall portion 38. Likewise, the second end portion 36 contacts the first wall portion 38 at a connection surface 43 where fastening means are employed to secure the second end portion 36 to the first wall portion 38. The fastening means, while not specifically shown, may include mechanical fasteners including bolts, nuts, rivets, screws, press-fit fasteners, clasps, interference fittings, or the like, or by and/or thermal or chemical fastening means such as welding, braising, glues, or the like.

In some examples, the first wall portion 38 is composed of multiple modular sections or components such as a modular top section 44 forming an enclosing top 46 of the first wall portion 38, a horizontal bottom or base portion 48 forming an enclosing bottom 50 of the first wall portion 38, and a vertical wall 52. Each of the base portion 48, top section 44, and vertical wall 52 are connected by one or more fastening means as described above. More specifically, the top section 44, base portion 48 and vertical wall 52 contact one another at one or more connection surfaces 53, where the fastening means are employed to secure the modular top section 44, base portion 48, and vertical wall 52 together. In further examples, the first wall portion 38 may be a unitary construction or molding having a substantially rectangular "C"-shaped cross section defining the modular top section 46, base portion 48, and vertical wall 52 portions.

Like the first container section 16, the second container section 18 is formed of a modular third end portion 54, a modular fourth end portion 56, and a modular second wall portion 58. The third end portion 54 contacts the second wall portion 58 at a connection surface 43 where fastening means as described above are employed to secure the third end portion 54 to the second wall portion 58. Likewise, the fourth end portion 56 contacts the second wall portion 58 at a connection surface 43 where fastening means are employed to secure the fourth end portion 56 to the second wall portion 58.

The third end portion 54 defines a rear end 40' of the second container section 18, while the fourth end portion 56 defines a front end 42' of the second container section 18, with the modular second wall portion 58 extending therebetween. The second wall portion 58 may be composed of a variety of modular components similar to those described above with respect to the first wall portion 38, or like the first wall portion 38, may be composed of a single unitary moulding or the like.

In several aspects, the base portion 48 of each of the first and second container sections 16, 18 has a concave arcuate shape extending from the first end portion 34 to the second end portion 36 of the first wall portion 38, and extending from the third end portion 54 to the fourth end portion 56 of the second wall portion 58. The concave arcuate shape of some examples is interrupted by at least two inset sections 59 sized and shaped to fit around wheel well intrusions in a vehicle cargo compartment. The two inset sections 59 allow for the storage container 14 to be loaded into a vehicle cargo compartment in either direction without fouling against the wheel well intrusions in the vehicle cargo compartment. That is, the front and rear ends 42, 42' and 40, 40' of the storage container 14 are reversible such that the storage container 14 can be loaded into the vehicle cargo compartment in in either a "forward" or "backward" direction. The base portion 48 further includes a plurality of wheels or casters 61. The casters 61 of some examples are disposed on a bottom surface 63 of the base portion 48 and provide the first and second container sections 16, 18 the ability to roll from place to place. The casters 61 are attached to the base portion 48 by known means such as mechanical fasteners including bolts, nuts, rivets, screws, press-fit fasteners, clasps, interference fittings, or the like. In several aspects, the casters 61 are made of one or more materials including but not limited to: metals, alloys, plastics, vinyls, composite materials, and the like.

In some aspects, the fastening means may also be movable devices such as hinges, accordion-folded attachments, or the like. Likewise, some or all of the first and second wall portions 38, 58 and the first, second, third, and fourth end portions 34, 36, 54, 56, and the top sections 46 and base portions 48 may be made up of multiple independent sections hinged, accordion-folded, or otherwise movably attached to one another. In an example of a food truck, one or more of the first and second wall portions 38, 58 may be formed of two longitudinally-extending sections, one disposed overtop the other and attached to one another at a horizontal hinge. The longitudinally-extending section disposed towards the top section 46 is thereby allowed to rotate downwards and towards the base portion 48, thus forming an opening through which food or other materials may be passed from the interior of the vehicle cargo compartment to customers outside the vehicle. Similarly, in a camping situation, the multiple independent sections may be expandable via accordion-fold attachments to allow the storage container 14 to be expanded substantially beyond the dimensions of the vehicle cargo compartment when the storage container 14 is outside the vehicle cargo compartment and unlocked.

The first and second partial volumes 30, 32 of storage space within the first and second container sections 16, 18 may be organized or sub-divided in a variety of different ways using modular organizational components 60. The organizational components 60 are affixed to the first and second container sections 16, 18 by any of a variety of known fastening means, such as mechanical fasteners including bolts, nuts, rivets, screws, press-fit fasteners, clasps, interference fittings, or the like. In the example of FIG. 1, the second partial volume 32 of storage space within the second container section 18 is divided by one or more shelves 62. The shelves 62 may be attached to the modular third and fourth end portions 54, 56, and/or the second wall portion 58 of the second container section 18.

In some aspects, some of the shelves 62 extend fully from the third end portion 54 to the fourth end portion 56. In other aspects, some shelves 62 extend only part of the distance between the third end portion 54 and the fourth end portion 56, thereby providing increased vertical space for stowage of tall items such as buckets 64, bar stock, brooms, shovels, or the like. Similar shelves 62 or other such structures may be affixed within the first partial volume 30 of storage space in the first container section 16. While in the foregoing, shelves 62 have been described as a means of organization within the first and second partial volumes 30, 32 of storage space, it should be appreciated that shelves 62 are intended as a non-limiting example. Other organizational structures may be used in one, the other, or both of the first and second partial volumes 30, 32 without departing from the scope or intent of the present disclosure. In several examples, additional or different organizational components 60 used may include shelves 62, cabinets, walls, drawers, hooks, bars, cages, clothes racks, or any of a variety of other such organizational components 60 without departing from the scope or intent of the present disclosure. Furthermore, the organizational components 60 may have particular adaptations for a given purpose. For example, some shelves 62 may be equipped with a lip, edge, or recesses for spill prevention, liquid retention, or the like. Likewise, the same types of organizational components 60 may be used in each of the first and second container sections 16, 18, or the first and second container sections 16, 18 may each have unique organizational components 60 disposed therein.

Turning now more specifically to FIGS. 3-6 and with continuing reference to FIGS. 1-4, the first and second container sections 16, 18 are movable relative to one another between at least the closed position 26 and an open position 66. In the open position 66, the first and second container sections 16, 18 are effectively independent of one another, and may be moved entirely separately from one another. In an example, the first and second container sections 16, 18 may be loaded with cargo, for example, buckets 64, packages for delivery (not specifically shown), or the like in entirely different locations within a factory or warehouse. The first and second container sections 16, 18 may then be moved to a single location for loading into delivery vehicles, at which time, the first and second container sections 16, 18 are moved into the closed position 26 and loaded into a vehicle together. In order to secure the first and second container sections 16, 18 together, the storage container 14 has a locking mechanism 68.

The locking mechanism 68 has four primary components: a lock handle 70, a lock arm 72, a pivot shaft 74, and a lock track 76. As shown in the drawings, in several aspects, each of the first and second container sections 16, 18 includes distinct portions of the locking mechanism 68, however, it should be appreciated that variations in which each of the first and second container sections 16, 18 includes all of the locking mechanism 68 components are intended to be included in the scope of the present disclosure. One copy of the locking mechanism 68 is described in further detail below, however, it should be appreciated that the storage container 14 may be equipped with a single locking mechanism 68 or any number of additional locking mechanisms 68 without departing from the scope or intent of the present disclosure. For example, the locking mechanism 68 may be located only at the front and rear ends 42, 42' and 40, 40' of the storage container 14, at only one of the front and rear ends 42, 42', 40, 40' or there may be additional locking mechanisms 68 disposed throughout the storage container 14, such as within a dividing wall (not specifically shown) disposed within the storage container 14 and parallel to the end portions 34, 36, 54, 56 of the storage container 14. In a particular example, a first locking mechanism 68' is disposed at the front end 42, 42' of the storage container 14, and a second locking mechanism 68'' is disposed at the rear end 40, 40' of the storage container 14.

Figure 7:
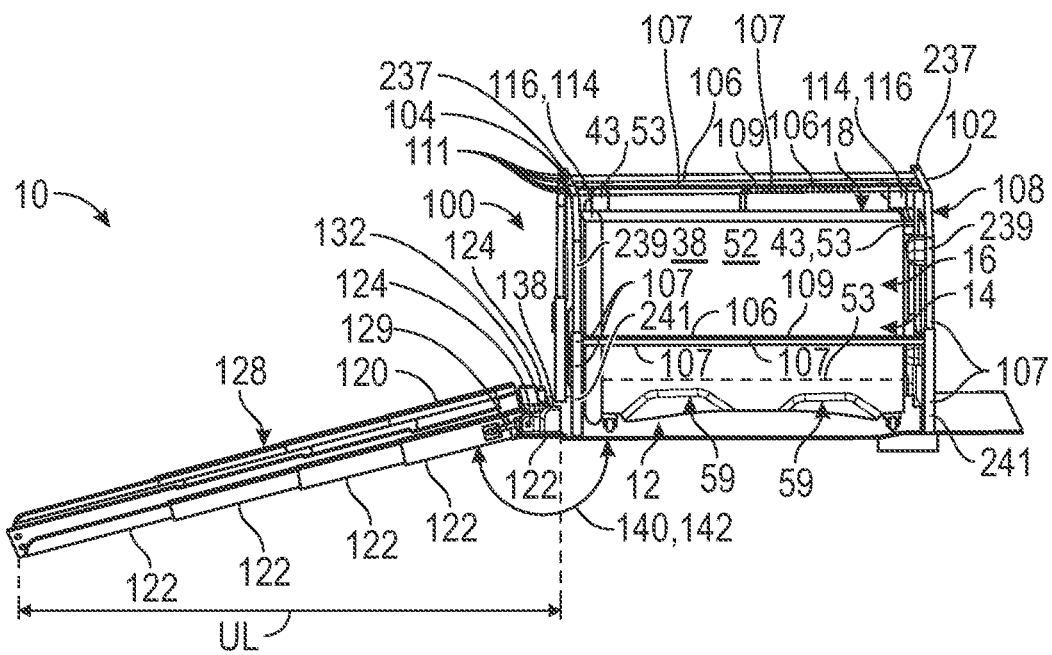
FIG. 7 is a perspective side view of the modular portable storage container system of FIG. 1 showing a ramp in an extended according to an aspect of the present disclosure.

The pivot shaft 74 is a horizontally and longitudinally-disposed cylindrical rod, torsion tube, or torque tube that is freely rotatable within a set of bearings 78 disposed in the first and second end portions 34, 36 of the first container section 16. The pivot shaft 74 defines an axis of rotation for the lock handle 70, and lock arm 72. In food and/or medical applications, the bearings 78 are food safe or medical grade sealed bearings 78. More specifically, as shown in FIG. 7, the pivot shaft 74 extends fully from a point exterior to the first end portion 34, through the first end portion 34, through the first partial volume 30 of storage space through the second end portion 36 to a point exterior to the second end portion 36. In several aspects, the pivot shaft 74 extends through a portion of one or more of the shelves 62. The external extremities or ends 80 of the pivot shaft 74 engage with and are fixed for common rotation with lock handles 70. Similarly, the lock arm 72 is fixed for common rotation with the pivot shaft 74. The lock handle 70, lock arm 72, and pivot shaft 74 are rotatable between at least an unlocked position 82 and a locked position 84. The lock arm 72 is located at least partially within a hollow area 86 formed within each of the first and second end portions 34, 36. The lock arm 72 extends radially outwardly from the pivot shaft 74 to a roller assembly 88. The roller assembly 88 is sized and shaped to fit within and engage with the lock track 76.

In several aspects, the lock track 76 is a roll-formed component formed of galvanized steel, aluminum, composite materials, or the like. The lock track 76 of some examples includes at least three separate sections, at least two of which are disposed in a second hollow area 87 formed the second container section 18, while the third is disposed in the hollow area 86 of the first container section 16. More specifically, the lock track 76 within the first container section 16 consists of a curvilinear storage section 90. The storage section 90 is disposed within the first and second end portions 34, 36. The curvilinear storage section 90 forms an arc section of a substantially circular section of lock track 76 that is substantially identical in radius to the distance defined by the length of the lock arm 72 between the pivot shaft 74 and the roller assembly 88. When the lock arm 72 is in the unlocked position 82, the roller assembly 88 is disposed within the storage section 90 of lock track 76 within the first container section 16, and the first and second container sections 16, 18 are freely movable relative to one another.

By contrast, when the open side 24 of the first container section 16 and the open side 24' of the second container section 18 are facing one another, and the first and second container sections 16, 18 are correctly spaced apart from one another, the lock arm 72 can be rotated to engage with the two remaining lock track 76 sections. The two remaining lock track sections 76 are disposed in the second container section 18, and specifically within the third and fourth end portions 54, 56. The remaining lock track 76 sections are a fluted open portion 92 and a closed end portion 94 with a continuous track portion 93 disposed therebetween. The fluted open portion 92 is a curvilinear section of the lock track 76 which opens towards the first container section 18 and is located at a height below the height at which the curvilinear storage section 90 is disposed within the first container section 16. In several aspects, the fluted open portion 92 has larger and/or wider dimensions at the portion facing and proximate the first container section 16 and narrows to a smaller and/or narrow set of dimensions at a portion farther within the second container section 18 and farther away from the first container section 16. The fluted open portion 92 is thus sized and shaped to capture the roller assembly 88 of the lock arm 72 as the lock arm 72 is rotated towards the second container section 18 from the unlocked position 82 towards the locked position 84. The fluted or widened shape of the fluted open portion 92 allows for some positioning error of the first and second container sections 16, 18 relative to one another without disrupting the efficacy of the locking mechanism 68. In several aspects, farther from the first container section 16, and deeper within the second container section 18, the fluted open portion 92 straightens into a less acutely curved section of the lock track 76.

At its farthest extent within the second container section 18, the fluted open portion 92 meets the continuous track portion 93 of the lock track 76. The continuous track portion 93 has a substantially consistent cross-sectional size along its entire length all the way from the fluted open portion 92 to the closed end portion 94. The continuous track portion 93 is a substantially linear section of lock track 76 which extends at an angle 95 downwards and away from the first container section 16. The closed end portion 94 is disposed at a downward-most end of the continuous track portion 93 proximate the base portion 48 of the second container section 18. The precise angle 95 at which the continuous track portion 93 extends downwards and away from the first container section 16 may vary from application to application without departing from the scope or intent of the present disclosure. As the lock arm 72 is moved from the unlocked position 82 to the locked position 84, the lock arm 72 traverses the space between the first and second container sections 16, 18 and the roller assembly 88 is captured by the fluted open portion 92. Once captured, the roller assembly 88 is centered by and rolls within the fluted end portion 92 downwards, through the continuous track portion 93 and towards the closed end portion 94. As a user continues to actuate the lock handle 70 from the unlocked position 82 towards the locked position 84 while the roller assembly 88 is in the fluted open portion 92, the fluted open portion 92 directs the roller assembly 88 into the continuous track portion 93, and eventually to the closed end portion 94. The downward angle 95 at which the continuous track portion 93 extends causes the roller assembly to exert a closing force "F" between the lock track 76 and the pivot shaft 74, thereby drawing the first and second container sections 16, 18 closer together. As the roller assembly 88 of the lock arm 72 approaches the terminus of the closed end portion 94 proximate the base portion 48 of the second container section 18, the first and second container sections 16, 18 are drawn forcibly into contact with one another such that the first and third end portions 34, 54, and the second and fourth end portions 36, 56 are in contact with one another. Likewise, the base portions 48 and the top sections 46 of each of the first and second container sections 16, 18 are drawn into contact with one another in the locked position 84. Additional locking features such as padlocks, pins, locking rings, or the like may then retain and secure the lock handle 70, and/or the lock arm 72, and/or the pivot shaft 74 and therefore the entire locking mechanism 68 in the locked position 84. When locked, the additional locking features prevent accidental or unwanted movement of the first and second sections 16, 18 relative to one another. In several aspects, because the locking mechanism 68 is disposed at both the front and rear ends 42, 42' and 40, 40' of the storage container 14, the locking mechanism 68 rigidly retains the first and second container sections 16, 18 against one another, allowing the storage container 14 to be moved from place to place without the container sections 16, 18 separating from one another.

The modular portable storage container system 10 further includes a blocking frame 100. The blocking frame 100 is sized and shaped to fit within a vehicle cargo compartment and secures the first and second container sections 16, 18 within the cargo compartment. Accordingly, the precise size and shape of the blocking frame 100 may therefore vary substantially from application to application, as the size and shape of a particular cargo compartment may vary substantially from vehicle to vehicle. The blocking frame 100 is immovably secured within the cargo compartment by known means, such as mechanical fasteners including bolts, nuts, rivets, screws, interference fittings, and the like, and/or thermal or chemical fastening means such as welding, braising, glues, or the like. In some examples, multiple blocking frames 100 may be used in a single cargo compartment, while in other examples, only a single blocking frame 100 may be necessary. The blocking frame 100 can be made of a number of different types of materials, and in a variety of different manufacturing processes without departing from the scope or intent of the present disclosure. In several aspects, the blocking frame 100 consists primarily of a front frame portion 102 connected to a rear frame portion 104 by a plurality of longitudinal bars 106. The front frame portion 102, rear frame portion 104 and longitudinal bars 106 of one example are metal extrusions, castings, or the like and are secured to one another by known means such as mechanical fasteners including bolts, nuts, rivets, screws, interference fittings, and the like, and/or thermal or chemical fastening means such as welding, braising, glues, or the like.

In several aspects, the blocking frame 100 is expandable. The expandable nature of the blocking frame 100 allows similar or identical blocking frame 100 components to be manufactured for use in a variety of applications. That is, because the blocking frame 100 of some examples is expandable, the same blocking frame components may be used in a space-efficient manner within a vehicle cargo compartment having a volume substantially smaller than the volume of a second vehicle cargo compartment. However, the expandable blocking frame 100 allows the same front and rear frame portions 102, 104 and longitudinal bars 106 in an expanded position within the second vehicle cargo compartment as well. Likewise, the expandable blocking frame 100 allows the same blocking frame 100 assembly with storage containers 14 of varying sizes for use in different applications. That is, the expandable blocking frame 100 is expandable from a first configuration to a second configuration having dimensions substantially larger than the first configuration, or any of a variety of configurations therebetween.

More specifically, in an expandable example of the blocking frame 100, each of the front frame portion 102, rear frame portion 104, and longitudinal bars 106 is composed of interlocking frame segments 107. In the example shown in the figures, the interlocking frame segments 107 are telescoping bar portions having a plurality of detents 109 and locking pins 111. The locking pins 111 may be any of a variety of known pin-like features including, but not limited to: bolts and nuts, rivets, screws, interference fittings, press-fit fasteners, spring pins, cotter pins, screws, or the like. The locking pins 111 are sized and shaped to interact with the detents 109 to secure interlocking frame segments 107 of the front frame portion 102, and/or rear frame portion 104 and/or longitudinal bars 106 to other interlocking frame segments 107 of each of the front, rear, and longitudinal bar 102, 104, 106 portions of the blocking frame 100.

Each of the plurality of detents 109 is spaced apart from the next of the plurality of detents 109 by a predetermined distance. In a particular example, the spacing between each of the plurality of detents 109 is approximately one inch. However, it should be appreciated that in a one inch separation between the detents 109 is merely intended to be an exemplary arrangement, and variations in distance between the detents 109 of other examples are intended to be within the scope of the present invention. In still further examples, the interlocking frame segments 107 may be attached to one another by any of a variety of known movable but lockable mechanisms, including but not limited to the above-described detents 109 and locking pins 111, as well as hinges, press-fit locking features, or the like.

The front frame portion 102 is disposed towards the front of the vehicle cargo compartment and includes one or more blocking members 108 forming a narrow door frame 110. The narrow door frame 110 is sized to allow a user, such as a vehicle driver or an automated robotic device to pass at least partially through the narrow door frame 110 to access the storage container 14. However, even when the storage container 14 is in the closed position 26, the storage container 14 is too wide to fit through the narrow door frame 110. That is, the blocking members 108 prevent longitudinal movement of the storage container 14, and even the first and second container sections 16, 18 within the vehicle cargo compartment while also allowing a user to pass into a space between the first and second container sections 16, 18 when the first and second container sections 16, 18 are in the open position 66.

The rear frame portion 104 is disposed towards the rear of the vehicle cargo compartment and defines a wide door frame 112. The wide door frame 112 is larger, and specifically significantly wider than the narrow door frame 110. The wide door frame 112 is sized to allow passage of the storage container 14 when the first and second container sections 16, 18 are in the closed position 26. In some examples, the rear frame portion 104 further includes one or more leg portions 113. The leg portions 113 extend laterally inward and towards a centerline of the vehicle cargo compartment. In several aspects, the leg portions 113 are spaced apart by a distance sufficient to allow passage of the storage container 14 when the first and second container sections 16, 18 are in the closed position 26.

The plurality of longitudinal bars 106 provide end-to-end support for the front and rear frame portions 102, 104 while spacing the front and rear frame portions 102, 104 apart by a distance substantially similar to, but slightly larger than longitudinal dimensions of the storage container 14.

The blocking frame 100 also has a lock bar 114. The lock bar 114 is rotatably mounted to the blocking frame 100 and is rotatable between a locked bar position 116 and an unlocked bar position 118. More specifically, the lock bar 114 is mounted to the blocking frame 100 approximately centrally above one or more of the narrow door frame 110 and the wide door frame 112, and extends laterally across a portion of the vehicle cargo compartment. The lock bar 114 may be manually or automatically operated without departing from the scope or intent of the present disclosure. In several aspects, when the lock bar 114 is in the unlocked bar position 118, the lock bar 114 is stowed up and proximate a ceiling (not specifically shown) of the vehicle cargo compartment. Thus, in the unlocked bar position 118, the storage container 14 in the closed or open positions 26, 66, may be moved freely within the blocking frame 100. However, when the first and second container sections 16, 18 are in the open position 66 and separated fully from one another such that the first and second container sections 16, 18 are up against the longitudinal bars 106 of the vehicle cargo compartment, the lock bar 114 may be freely moved into the locked bar position 116. In the locked bar position 116, the lock bar 114 is rotated downwards so that it defines a substantially vertical planar surface extending laterally across a portion of one or more of the narrow door frame 110 and the wide door frame 112. In the locked bar position 116, the lock bar 114 touches and engages with each of the first and second container sections 16, 18, and immobilizes the first and second container sections 16, 18, relative to one another and the blocking frame 100. Accordingly, in the locked bar position 116, the lock bar 114 retains the first and second container sections 16, 18 in the open position 66 within the cargo compartment of the vehicle, thereby allowing users access to contents of each of the first and second container sections 16, 18 while preventing lateral movement of the first and second container sections 16, 18 while the vehicle is in motion. Likewise, the front and rear frame portions 102, 104, and the longitudinal bars 106 prevent both longitudinal and lateral movement of the first and second container sections 16, 18 when the lock bar 114 is in the locked bar position 116.

In several aspects, the front and rear frame portions 102, 104, and the longitudinal bars 106, including the blocking members 108, and leg portions 113, may have shock absorption material disposed thereon. In some examples, the shock absorption material is composed of rubber, silicone, or other similarly flexible but semi-rigid materials. Likewise, the shock absorption material may be formed into nodes such as stoppers, padding, or the like. Furthermore, it should be appreciated that the shock absorption material is sized and shaped differently depending on the size and shape of the blocking frame 100, and the storage container 14. The shock absorption material holds or wedges the first and second container sections 16, 18 immovably in place within the vehicle cargo compartment when the lock bar 114 is in the locked position 116.

Figure 8:
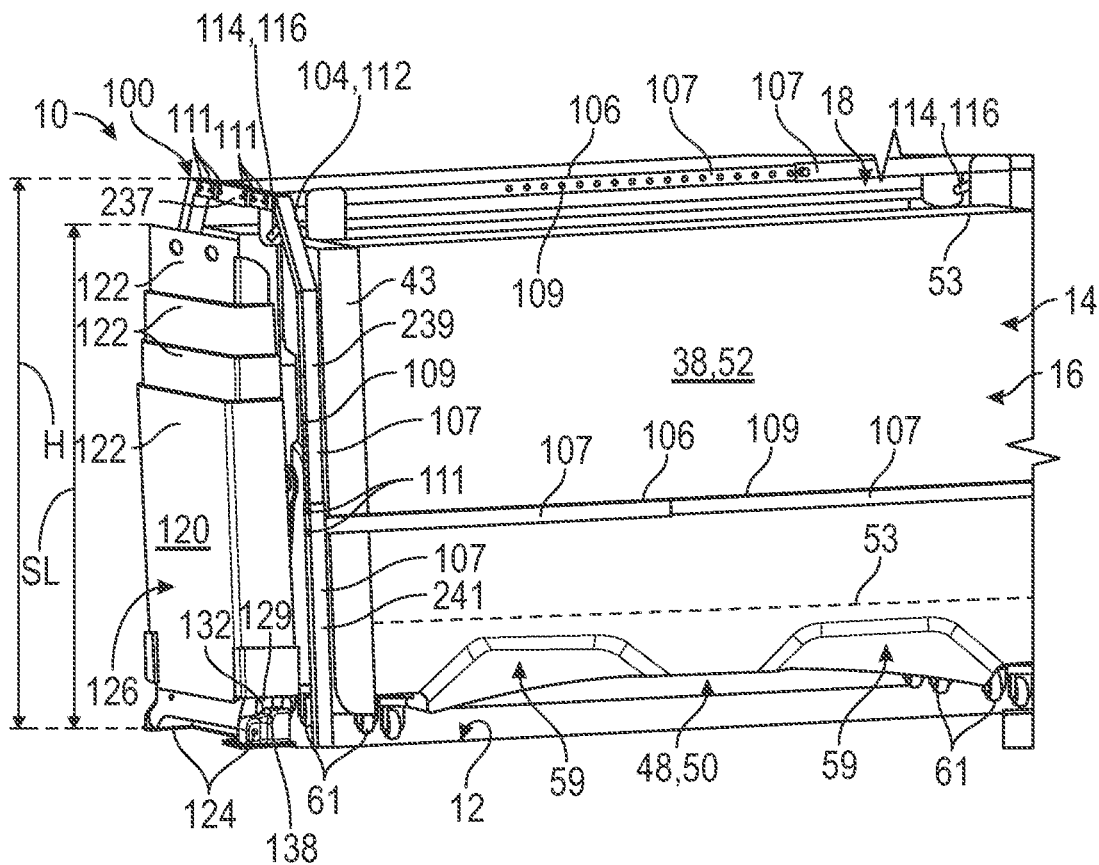
FIG. 8 is a partial perspective side view of the modular portable storage container system of FIG. 7 showing the ramp in an unextended or stowed position according to an aspect of the present disclosure.

Turning now to FIGS. 7 and 8, and with continuing reference to FIGS. 1-6, in some examples, the modular portable storage container system 10 further includes an extendable ramp 120. The extendable ramp 120 may vary in size, precise location, and the like depending on the particular application in which the extendable ramp 120 is used. In several aspects, the extendable ramp 120 has a plurality of extendable sections 122. The extendable sections 122 may be foldable relative to one another, or as shown in the figures, the extendable sections 122 may telescope relative to one another. At least one of the plurality of extendable sections 122 is rotatably affixed to a vehicle proximate a vehicle tailgate opening (not specifically shown), at one or more pivot points 124. Thus, the extendable ramp 120 can be rotated between at least a stowed position 126 and an unstowed position 128. In the stowed position 126, the extendable ramp 120 is positioned substantially vertically above the pivot points 124 and the extendable sections 122 are in an unextended or stowed state such that the extendable ramp 120 has a stowed length "SL" shorter than a height "H" of the blocking frame 100.

The pivot points 124 may be any of a variety of known rotating mechanisms, including hinges or the like without departing from the scope or intent of the present disclosure. However, in one particular example, the pivot points 124 include a spring-loaded locking pin 129 and a hinge base 130. The hinge base 130 is affixed to the vehicle on or proximate the cargo floor 12. The hinge base 130 defines the pivot point 124 itself, as well as a curvilinear ramp portion 132. The curvilinear ramp portion 132 extends from a rearward-facing portion 134 of the hinge base 130 to an upward-facing portion 136. A receiver 138 is formed in the upward-facing portion 136. The receiver 138 is sized and shaped to accept and retain the spring-loaded locking pin 129 therein when the ramp is in the stowed position 126. Thus, when the extendable ramp 120 is in the stowed position 126, the spring-loaded locking pin 129 fits into the receiver 138 thereby locking the extendable ramp 120 in place in the stowed position. A user can then pull up on or otherwise retract the spring-loaded locking pin 129 from the receiver 138 and rotate the extendable ramp 120 from the stowed position 126 to the unstowed position 128. Conversely, the spring-loaded locking pin 129 is biased into contact with the curvilinear ramp portion 132, and when the extendable ramp 120 is rotated from the unstowed position 128 to the stowed position 126, the spring-loaded locking pin 129 follows the curvilinear ramp portion to the upward-facing portion 136 where the spring-loaded locking pin 129 automatically engages with the receiver 138.

In the unstowed position 128, the extendable ramp 120 can be extended from the stowed length SL to an unstowed length "UL". The unstowed length UL may vary depending on the particular situation in which the extendable ramp 120 is being used. For example, at a loading dock, the extendable ramp 120 may not be fully extended, and may form a substantially horizontal surface from the loading dock lip (not specifically shown) to the cargo floor 12 of the cargo compartment of the vehicle. In another example, vehicle may be on level ground, and the extendable ramp 120 may be unstowed to a position below the horizontal such that each of the extendable sections 122 is maximally extended and where the unstowed length UL substantially greater than the stowed length SL. In the latter example, the concave arcuate shape of the base portion 48 is sized and shaped to pass over a hump 140 defining a slope or angle 142 of the extendable ramp 120 relative to the floor 12 of the cargo compartment, such that the base portion 48 does not contact or get hung up on the extendable ramp 120, the floor 12, or hump 140 at which the floor 12 and extendable ramp 120 meet. In several aspects, the extendable ramp 120 is equipped with a variety of latching mechanisms which, when the extendable ramp 120 is in the unstowed position 128, lock the extendable sections 122 in place relative to one another. The latching mechanisms may be any of a variety of known or novel latching mechanisms including but not limited to: cotter pins, spring pins, clamps, spring clamps, spring loaded hinges, or the like.

The modular nature of the portable storage container system 10 allows for storage containers 14 of varying sizes, shapes, and the like for use in industrial applications, as well as in personal or private use. The storage containers 14 and blocking frames 100 may be sized for use in semi trucks, tractor trailers, delivery vans, mail trucks, station wagons, train cars, or the like without departing from the scope or intent of the present disclosure. For some examples, the storage containers 14 and blocking frames 100 may be used in portable power station applications with a generator housed in one of the first and second container sections 16, 18 and electrical or fuel ancillaries housed in the other of the first and second container sections 16, 18. Likewise, the storage containers 14 and blocking frames 100 may be used in camping situations where the storage containers 14 are pre-loaded with camping gear (i.e. tents, tables, sleeping rolls and bags, portable stove, cookware, and the like) and unstowed from a vehicle at a campsite where the first and second container sections 16, 18 are separated and their contents unstowed for users to access the camping equipment stored therein. In further examples, the first and second container sections 16, 18 may be adapted as refrigeration units for transport of food, medical supplies, mortuary units, or the like.

In some examples, multiple storage containers 14 may be placed into a single blocking frame 100 having additional lock bars 114 disposed therein. Likewise the modularity of the first and second end portions 34, 36 and third and fourth end portions 54, 56 and the first and second wall portions 38, 58 means that first and second wall portions 38, 58 having different lengths for differing applications may be used with the same first, second, third, and fourth end portions 34, 36, 54, 56. Likewise, first, second, third, and fourth end portions 34, 36, 54, 56 having different widths for differing applications may be used with the first and second wall portions 38, 58 having lengths optimized for a particular application. That is, the modularity of each of the first, second, third, and fourth end portions 34, 36, 54, 56, and the first and second wall portions 38, 58 allows the same fundamental components to be used in a wide variety of different applications. of the present disclosure offers several advantages.

Furthermore, the first, second, third, and fourth end portions 34, 36, 54, 56 may be equipped as described above with a keyway or coupling mechanism. The coupling mechanism (not specifically shown) may be used to couple a storage container 14 to one or more other storage containers 14 to form a train of multiple storage containers 14. The coupling mechanism may be any of a variety of coupling mechanisms including but not limited to: Janney couplers, screw couplings, knuckle couplings, drawbars, pins and sockets, ball hitches, gooseneck hitches, pintle hitches, receiver hitches, hinged or rigid or flexible arms with coupling components, or the like. Trains of storage containers 14 can be used in warehouse applications to move quantities of goods from location to location. In further examples, the coupling mechanism may be separate from the keyway and may instead be formed in or mounted to each of the first and second container sections 16, 18, such that the first and second container sections 16, 18 may be moved separately from one another. In the latter example, the first and second container sections 16, 18 may be loaded with different materials or cargo at completely different locations within a factory or warehouse setting, or the like. The first and second container sections 16, 18 may then be manually or automatically moved from their distinct locations within the factory to a central location where the first and second container sections 16, 18 are joined together in the locked position 84 for loading into a cargo compartment of a transport vehicle.

The first and second container sections 16, 18, and/or the storage container 14 itself of some examples are stackable. That is, multiple first container sections 16 may be stacked atop one another, multiple second container sections 18 may be stacked atop one another, and/or multiple complete storage containers 14 may be stacked atop one another. In several aspects, in instances where the first and second container sections 16, 18, and/or storage container 14 are stackable, the top sections 46 are shaped to accept and partially enclose the casters 61 of the first and second container sections 16, 18, and/or storage container 14 above. Similarly, the base portion 48 may have additional contours molded therein (not specifically shown). The additional contours may be adapted to accept lifting devices, such as fork-lift prongs, or the like. Similarly, the first and second end portions 34, 36 and wall portions 38 may be formed with recesses, protrusions, or other such features sized and shaped to allow engagement with moving devices such as fork-lifts, or the like. These recesses, protrusions or the like provide a simple way for the storage containers 14 and/or separate first and second container sections 16, 18 to be moved from place to place.

Figure 9A:
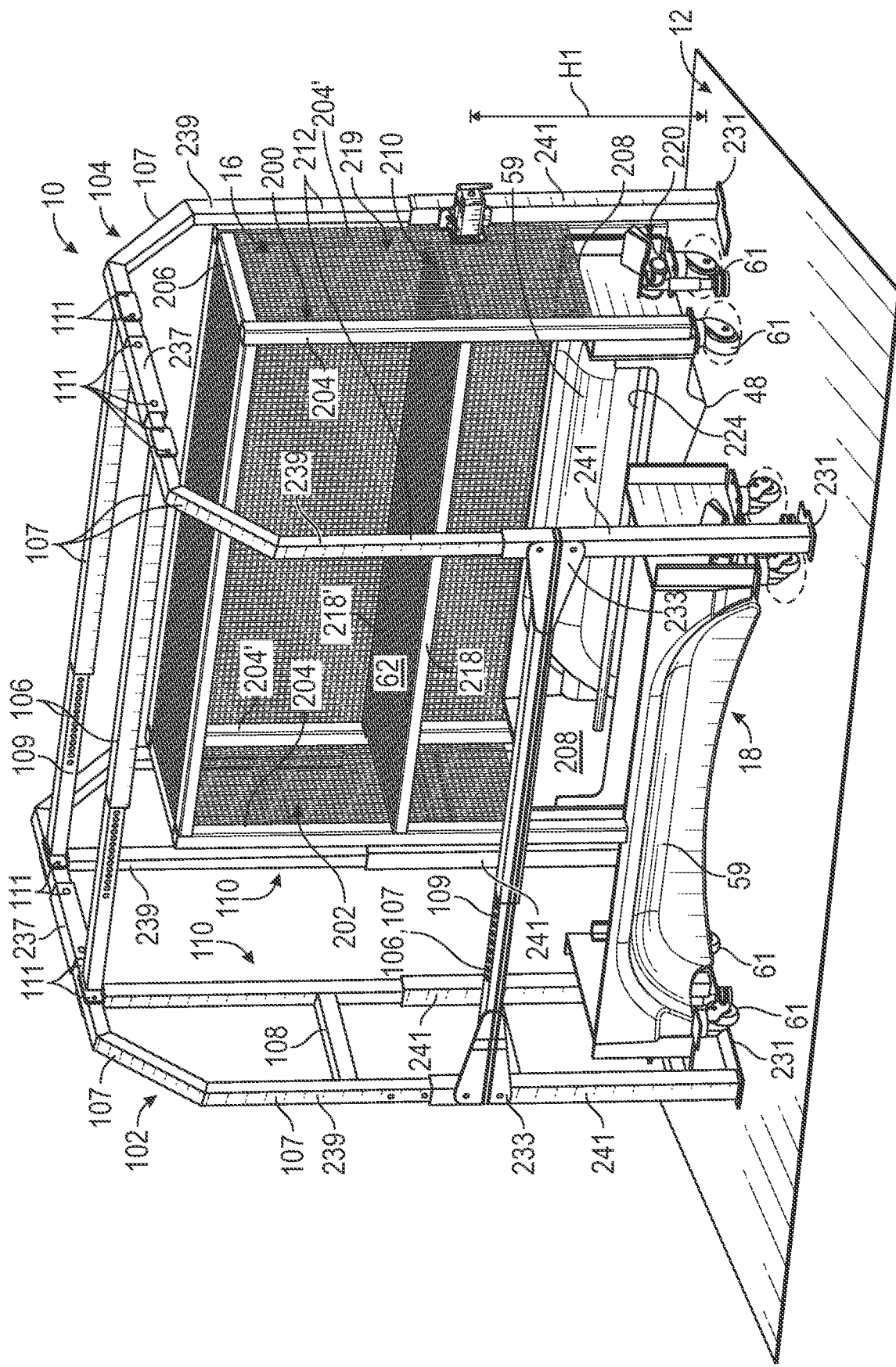
FIG. 9A is a partial perspective rear view of a modular portable storage container system having a brake mechanism and latch mechanism according to an aspect of the present disclosure.
Figure 9B:
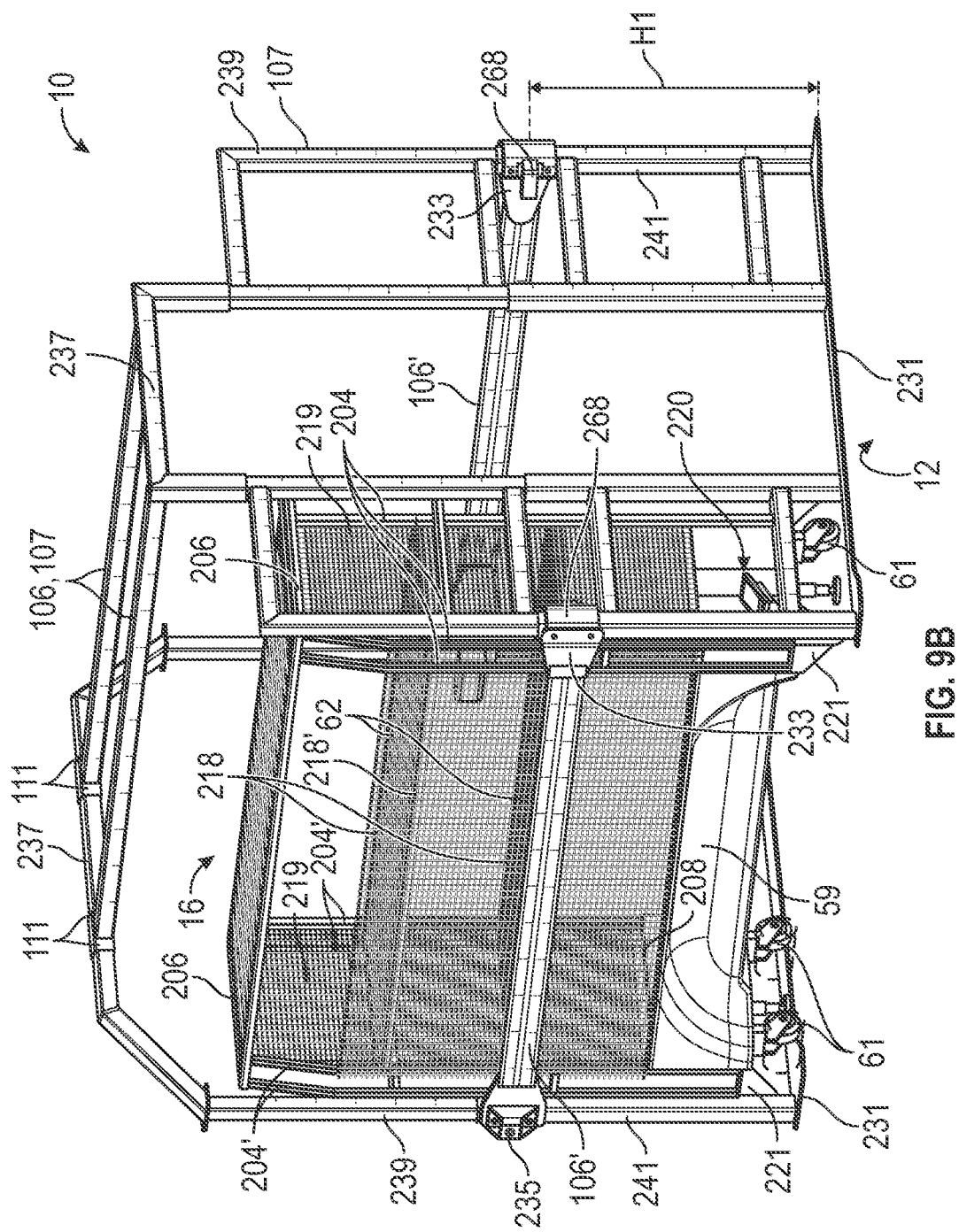
FIG. 9B is a partial perspective rear view of a second embodiment of a modular portable storage container system having a brake mechanism and a latch mechanism according to an aspect of the present disclosure.

Turning now to FIGS. 9A and 9B, examples of the modular portable storage container system 10 of the present disclosure are shown. In the example of FIG. 9A, the modular portable storage container system 10 includes both first and second container sections 16, 18 as described hereinabove. In several aspects, the first and second container sections 16, 18 shown in FIG. 9A and the first container section 16 shown in FIG. 9B are composed primarily of metal or metal alloys. It should be appreciated that only part of the second container section 18 is shown in FIG. 9A, and only a first container section 16 is shown in FIG. 9B for the sake of simplicity. Specifically, the first and second container sections 16, 18 each include a structural frame 200. The structural frame 200 includes at least a front section 202 with vertical members 204 connected to a top member 206 and a bottom member 208.

Similarly, the structural frame 200 includes a rear section 210 with outer vertical members 204' connected to a top member 206 and a bottom member 208. The front and rear sections 202, 210 are rigidly affixed to one another by one or more longitudinal members 212 extending from the front section 202 to the rear section 210. The front and rear sections 202, 210 are also rigidly affixed to one another by the base portion 48 which forms the bottom member 208 of each of the front and rear sections 202, 210 of each of the first and second container sections 16, 18. In some examples, and as shown in FIGS. 9A and 9B, the first and second container sections 16, 18 may include one or more shelves 62. The shelves 62 of some examples may include additional front and rear structural members 214, 216, as well as longitudinal structural members 218, 218'. The longitudinal structural members 218, 218' extend longitudinally between and are rigidly affixed to each of the front and rear sections 202, 210 of each of the first and second container sections 16, 18.

In several aspects, the structural frame 200 of the first and second container sections 16, 18 is equipped with enclosing material 219. The enclosing material 219 may be any of a wide variety of different materials including but not limited to: metals, alloys, plastics, vinyls, fabrics, composite materials, and the like. In the example shown in FIGS. 9A and 9B, the enclosing material 219 defines a wire mesh material extending between at least each of the vertical members 204, 204', top members 206, 206', longitudinal members 212, front and rear structural members 214, 216, and longitudinal structural members 218, 218', as well as extending towards and engaging with the bottom members 208. In further examples, multiple vertical portions 204, 204' may be used. That is, multiple vertical portions 204, 204' may form a portion of the ends of the structural frame 200 as shown in FIG. 9B. When multiple vertical portions 204, 204' are used, one or more of the vertical portions 204, 204' may provide both additional rigidity to the structural frame 200 as well as offering users locations which may be grasped by human hands, mechanical devices, such as robotic arms, or other such manipulation means.

In some examples, the first and second container sections 16, 18 may be equipped with one or more skirts 221. The skirts 221 are mounted to the first and second container sections 16, 18 at locations defining the bottom corners of the first and second container sections 16, 18. The skirts 221 shown in FIG. 9B define an open-sided tetrahedron in which the open side of the prism faces the casters 61 of the first and second container sections 16, 18. However, it should be appreciated that the precise shape and construction of the skirts 221 may vary from application to application and may include triangular prismatic shapes, cylindrical shapes, or any other such shapes that provide protection to the casters 61 of the first and second container sections 16, 18. That is, the skirts 221 act as guards for the casters 61, substantially preventing or diminishing the potential for physical interference with the rolling and/or spinning motion of the casters 61. The skirts 221 also provide a means to guide the first and second container sections 16, 18 during loading and/or unloading into a vehicle cargo compartment, and/or within a warehouse, or the like.

As shown in FIGS. 9A and 9B, the base portion 48 of each of the first and second container sections 16, 18 is equipped with a brake mechanism 220. The brake mechanism 220 consists of a brake pedal 222 rotatable about a brake pivot shaft 224. The brake pedal 222 is also connected to a brake pad 226 via an actuator rod 228 which is slidably disposed within a sleeve 230. The brake pivot shaft 224 extends longitudinally through the base portion 48 and protrudes through and beyond the confines of the base portion 48 at the front and rear sections 202, 210 of each of the first and second container sections 16, 18. The brake mechanism 220 may be formed of metal, plastic, composite materials, combinations thereof, or the like without departing from the scope or intent of the present disclosure.

Additionally, as shown in FIGS. 9A and 9B, the blocking frame 100 is immovably secured within the cargo compartment by mounting plates 231. The mounting plates 231 shown may be affixed to the floor 12 by known means, such as mechanical fasteners including bolts, nuts, rivets, screws, interference fittings, and the like, and/or thermal or chemical fastening means such as welding, braising, glues, or the like. In some examples, the mounting plates 231 may extend only to an area immediately surrounding the front and/or rear frame portion 102, rear frame portion 104, or the like. In other examples, the mounting plates 231 may extend for substantially an entire width of the blocking frame 100 thereby interconnecting the sides of the blocking frame 100. In some examples, the mounting plates 231 may include pre-formed apertures or mounting points that are located at positions where preexisting mounting points may be found within the cargo compartment of the motor vehicle. In other examples, the mounting plates 231 may be affixed to newly-formed mounting points within the cargo compartment, such as newly-drilled holes in the cargo compartment, or the like. In some examples, the mounting plates 231 are formed with beveled edges to facilitate and decrease user effort in moving the first and second container sections 16, 18 into and out of the cargo compartment and blocking frame 100. The beveled edges may stretch for the full width of the mounting plates 231 and/or for only a portion thereof.

In further aspects, the interlocking frame segments 107 may be affixed to one another by connector plates 233. The connector plates 233, like the interlocking frame segments 107 of the front and rear frame portions 102, 104, and longitudinal bars 106 may be formed of any of a variety of materials including but not limited to: metals, alloys, plastics, vinyls, composite materials, and the like. In several aspects, the longitudinal bars 106 of the blocking frame are formed of reinforced plates. More specifically, the longitudinal bars 106' shown in FIG. 9B are made of corrugated material having a substantially flat or planar portion, to which a reinforcing plate is attached. The reinforcing plate is formed of similar material to that from which the substantially flat or planar portion is made. The reinforcing plate is rigidly affixed to or otherwise formed unitarily with the substantially flat or planar portion. The resulting longitudinal bars 106' offer packaging advantages in that the corrugated material has a laterally narrow cross-sectional width by comparison with round, rectangular, or other such shapes of longitudinal bar 106 material. The corrugated longitudinal bars 106' also offer relatively light weight, rigid structure, and the like, each of which is at least comparable to the structural advantages offered by longitudinal bars 106 having other cross-sectional shapes.

The connector plates 233 are substantially planar and provide rigid connecting means for the interlocking frame segments 107. Because the connector plates 233 are substantially planar, the blocking frame 100 may be placed extremely closely to the physical structure of the cargo compartment of the vehicle itself. Accordingly, the blocking frame 100 utilizing connector plates 233 does not intrude substantially into the cargo space within the cargo compartment and maximizes the potential size of the first and second container sections 16, 18 which may be held within the blocking frame 100. In some examples, the connector plates 233 define attachment points for vehicle-to-blocking frame 100 connections. Specifically, as shown in FIG. 9B a vehicle attachment 235 is disposed on the blocking frame 100. The vehicle attachment 235 is a spacer rigidly affixed to the blocking frame 100 as well as to an interior surface of the vehicle cargo compartment. That is, the vehicle attachment 235 may have a variety of different shapes and sizes, depending on the particular vehicle cargo compartment into which the blocking frame 100 is mounted. The vehicle attachment 235 should be understood to be easily mountable to the connector plates 233 of the blocking frame 100, or to other portions of the blocking frame 100 without departing from the scope or intent of the present disclosure. In some examples, the vehicle attachment 235 is formed of a structurally rigid rectangular prismatic box-section or similar bar stock material with mounting points such as threaded apertures or the like cut into or otherwise formed into the vehicle attachment 235. In some examples, one or more bushings including rigid, solid, and/or flexible bushings are disposed in some or all of the mounting points of the vehicle attachment 235. The bushings assist users in locating the vehicle attachment 235 to the blocking frame 100 as well as guiding users in attaching the blocking frame 100 to the motor vehicle cargo compartment. Through use of the vehicle attachment 235, the blocking frame 100 may be rigidly mounted within any of a variety of vehicle cargo compartments, thereby reinforcing the blocking frame 100 and locating the blocking frame 100 at a specific location within the cargo compartment.

In some examples the blocking frame 100 is formed of multiple preassembled modular component sections. The multiple preassembled modular component sections may be interchangeable side-to-side and/or end-to-end. In FIG. 9B, for example, the blocking frame 100 includes a frame connector 237, upper frame sections 239, and lower frame sections 241. Each of the upper frame sections 239 shown defines a ladder-like construction composed of multiple interlocking frame segments 107 joined together by known means such as mechanical fasteners including bolts, nuts, rivets, screws, interference fittings, and the like, and/or thermal or chemical fastening means such as welding, braising, glues, or the like. Similarly, the lower frame sections 241 define ladder-like constructions composed of interlocking frame segments 107 joined by means such as those described hereinabove.

The upper and lower frame sections 239, 241 and the frame connector 237 may be provided to a user in a preassembled state, or in component parts, depending on the particular use application. In some examples, the interlocking frame segments 107 of the upper frame sections 239 have a smaller cross-sectional size than the cross-sectional size of the interlocking frame segments of the lower frame sections 241. Accordingly, the upper frame sections 239 and lower frame sections 241 may be assembled with one another via slip-fit attachments, interlocking or interference fit arrangements, or the like. In some examples, one or more portions of the upper frame sections 239 fit into and are retained within corresponding portions of the lower frame sections 241. The upper and lower frame sections 239, 241 may be permanently or temporarily assembled by use of known attachment means such as mechanical fasteners including bolts, nuts, rivets, screws, interference fittings, and the like, and/or thermal or chemical fastening means such as welding, braising, glues, or the like. Similarly, the frame connector 237 is formed of material having substantially the same or similar cross-sectional sizing as that of the lower frame sections 241. Accordingly, the frame connector 237 fits over and engages with one or more portions of the upper frame sections 239, thereby stabilizing and increasing the rigidity of the blocking frame 100. The frame connector 237 may be permanently or temporarily assembled to the upper frame sections 239 by use of known attachment means such as mechanical fasteners including bolts, nuts, rivets, screws, interference fittings, and the like, and/or thermal or chemical fastening means such as welding, braising, glues, or the like. It should further be appreciated that while the upper and lower frame sections 239, 241 have been described as having ladder-like constructions, variations which depart from ladder-like arrangements are intended to be within the scope of the present disclosure.

Turning now to FIGS. 10A and 10B, the brake mechanism 220 is shown in further detail. The brake pedal 222 may be made via known means such as injection molding, lost foam molding, welding of multiple component parts, or the like. In several aspects, the brake pedal 222 has a pedal surface 232 which is generally oriented upwards, while the brake pad 226 is generally oriented downwards, i.e. toward the floor 12 of the cargo compartment of a vehicle, or towards a floor 12 of a warehouse, or the like. The brake pad 226 is preferably formed of a non-slip or non-skid material such as a rubber, or other such material having a relatively high coefficient of static friction. Accordingly, when the brake pad 226 is engaged with the floor 12, the brake pad 226 prevents horizontal movement of the first and second container sections 16, 18.

The brake pedal 222 is mountable to the brake pivot shaft 224 in a limited number of orientations. For example, and as shown in FIG. 10, the ends 234 of the brake pivot shaft 224 are keyed such that rather than being substantially cylindrical in cross-sectional shape, the ends 234 of the brake pivot shaft 224 have flattened areas 236. The flattened areas 236 interact with corresponding flattened portions 238 of a receiving aperture 240 formed through the brake pedal 222. Thus, the brake pedal 222 may only be mounted on the ends 234 of the brake pivot shaft 224 in predefined orientations. Additionally, the flattened areas 236 and flattened portions 238 ensure that the brake pedal 222 cannot rotate independently of the brake pivot shaft 224 when the brake pedal 222 is engaged with the brake pivot shaft 224.

The actuator rod 228 is substantially cylindrical in shape and extends from the brake pedal 222 to the brake pad 226. More specifically, the actuator rod 228 is attached to the brake pedal 226 by a rod pin 241 which is disposed within a rod pin receiving aperture 242 formed through a portion of the brake pedal 222. The rod pin receiving aperture 242 defines an elongate hole formed through the brake pedal 222 at a location offset from the brake pivot shaft 224. More accurately, the brake pedal 222 includes multiple rod pin receiving apertures 242 disposed on opposite sides of the receiving aperture 240 for the brake pivot shaft 224. The brake pedal 222 is formed in this manner so that the same brake pedal 222 may be used in either left or right-handed applications. That is, the brake pedal 222 may be used in an arrangement as shown where the actuator rod 228 and brake pad 226 are disposed laterally to the right of the brake pivot shaft 224, or in an arrangement where the actuator rod 228 and brake pad 226 are disposed to the left of the brake pivot shaft 224. Accordingly, production costs can be saved by utilizing a single brake pedal 222 part in all applications. Likewise, the identical actuator rod 228, sleeve 230, and brake pad 226 may be used in either left or right-handed applications by the mere substitution of a differently constructed mounting plate 244.

The actuator rod 228 is slidably disposed within sleeve 230, which is sized and shaped to closely fit around and minimize non-axial movement of the actuator rod 228. That is, the sleeve 230 prevents wobble, or other such lateral movement of the actuator rod 228 as the brake pedal 222 is actuated. The sleeve 230 is fixedly attached to the base portion 48 via one or more mounting plates 244. The mounting plates 244 may be formed of any of a variety of materials including but not limited to: metals, alloys, plastics, vinyls, composite materials, and the like. In the example shown in the figures, the mounting plates 244 are mounted to the bottom surface 63 of the base portion 48 and provide structure to which the casters 61 may attach to the base portion 48. The base portion 48 may further be provided with one or more indentations or siting structures (not specifically shown) which are shaped to accept automated or manual movement means such as robotic arms, lifts, trolleys or the like. In some examples, the indentations or siting structures are formed integrally in the bottom surface 63 of the base portion 48. In other examples, the indentations or siting structures may further include attachment means, keyways, or the like, to further assist in guiding the automated or manual movement means to predefined positions optimally sited to engage with and allow movement of the first and/or second container sections 16, 18.

Referring once more to the mounting plates 244, the mounting plates 244 define substantially planar plate portions 246 extending substantially parallel to the floor 12, and a curved plate portion 248 sized and shaped to nest against curved portions of the bottom surface 63 of the base portion 48. The mounting plates 244 further include vertical planar plate portions 250 which are affixed to vertical portions of the front and rear ends 42, 42' and 40, 40' of the container sections 16, 18. That is, the vertical planar plate portions 250 abut and firmly brace against the front and rear ends 42, 42' and 40, 40' of the container sections 16, 18. The vertical plate portions 250 are fixedly attached to the substantially planar plate portions 246 by any known means, such as mechanical fasteners including bolts, nuts, rivets, screws, press-fit fasteners, clasps, interference fittings, or the like.

Because the sleeve 230 restricts non-axial movement of the actuator rod 228, in order for the brake pedal 222 to engage the brake pad 226 with the floor 12 without tilting or otherwise moving the actuator rod 228 in a non-axial direction, the rod pins 240 slide within the rod pin receiving apertures 242 formed through the brake pedal 222 as the brake pedal 222 is actuated. Additionally, in order to prevent accidental release of the brake mechanism 220, a spring-loaded retainer 252 is provided.

The spring loaded retainer 252 is affixed to one or more of the mounting plates 244 and defines a rod-shaped element 254 and a retainer spring 256. The rod-shaped element 254 extends from the mounting plates 244 and orthogonally through an orifice 258 formed through a portion of the sleeve 230. The actuator rod 228 further includes a detent 260 defined as a depression, scooped-out portion, or the like. The detent 260 defines a portion of the actuator rod 228 having a reduced cross section relative to the rest of the actuator rod 228, and is oriented such that when the brake pad 226 is in contact with the floor 12, the detent 260 is aligned with the orifice 258 in the sleeve 230. The retainer spring 256 biases an end 257 of the rod-shaped element 254 outwardly away from the mounting plates 244 and towards the orifice 258 within the sleeve 230. Accordingly, when the brake pad 226 is in contact with the floor 12 and the brake pedal 222 is in a locked position, the end 257 of the rod-shaped element 254 is pushed via the retainer spring 256 through the orifice 258 and into the detent 260 in the actuator rod 228, thereby locking the brake mechanism 220 in place in a locked or engaged position such that the brake pad 226 is retained against the floor 12. It should be appreciated that the brake pedal 222 is intended to be manipulated by a person's foot, or the like, thus the spring-loaded retainer 252 provides sufficient locking force to prevent accidental actuation of the brake pedal 222 away from the locked position but may easily be intentionally disengaged by application of sufficient vertical force to a portion of brake pedal 222 opposite the actuator rod 228.

While only a single brake mechanism 220 is shown in each of FIGS. 9, 10A, and 10B, it should be appreciated that the brake mechanism 220 may be present at only one end of each of the first and second container sections 16, 18, or at both ends. That is, it should be appreciated that the brake pivot shaft 224 extends through each of the first and second container sections 16, 18 and may have an identical set of brake mechanism 220 components disposed at and actuatable from each end of the first and second container sections 16, 18.

Figure 11A:
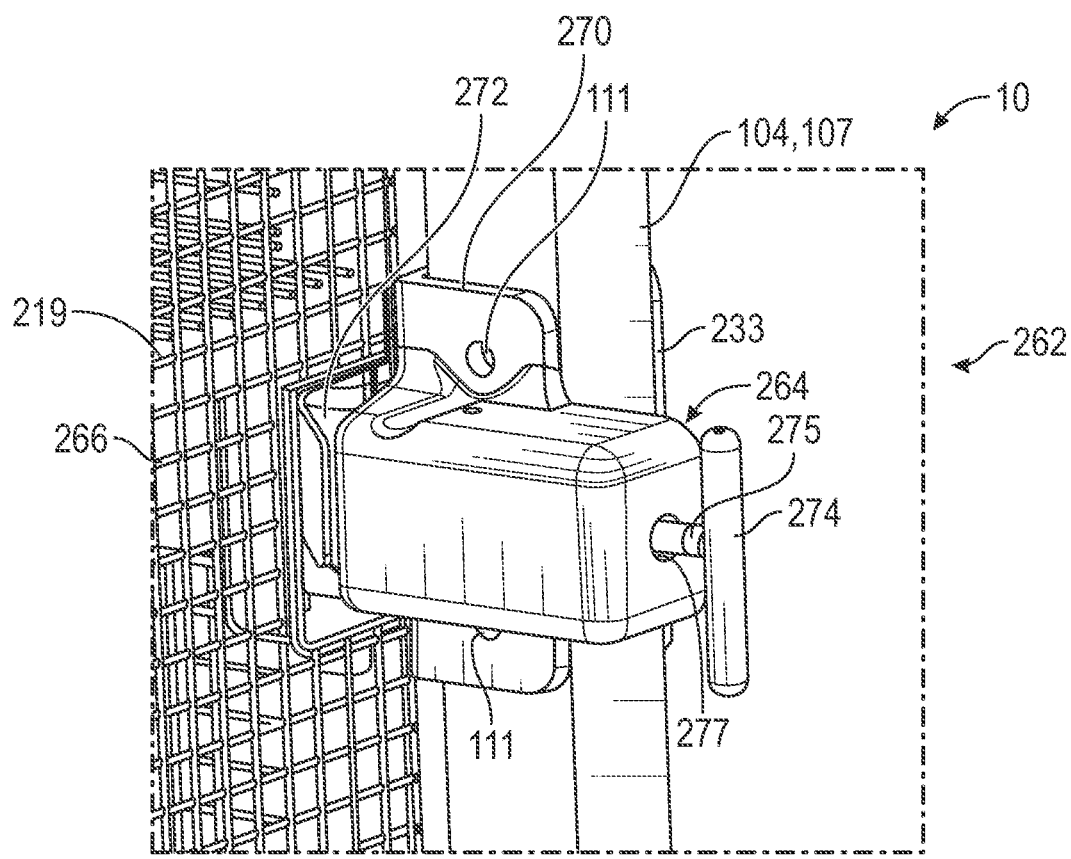
FIG. 11A is partial perspective rear view of a portion of the modular portable storage container system depicting the latch mechanism according to an aspect of the present disclosure.
Figure 11B:
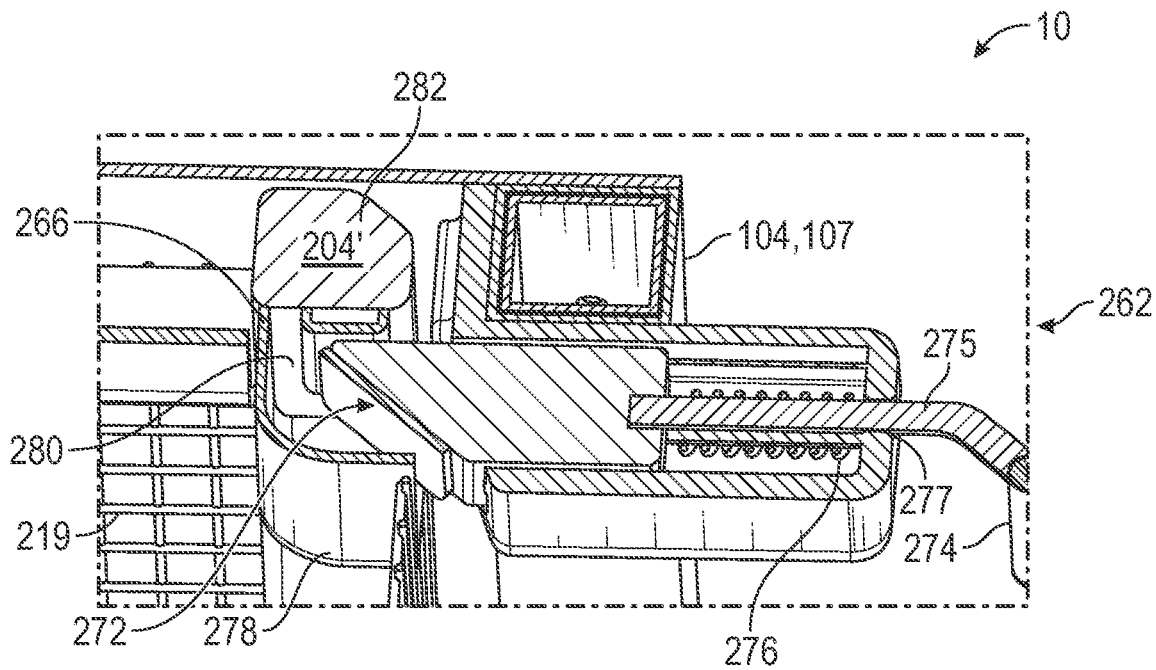
FIG. 11B is a partial perspective cross-sectional view of the latch mechanism of FIG. 11A according to an aspect of the present disclosure.

Turning now to FIGS. 11A, 11B, and 11O and with continued reference to FIGS. 1-10B, a portion of one of the first and/or second container sections 16, 18 and the blocking frame 100 is shown in further detail. In several aspects, the blocking frame 100 includes latch mechanism 262. The latch mechanism 262 consists, broadly, of a spring latch 264, a latch receiver 266, and a retaining hook 268. In several aspects, the latch receiver 266 is affixed to or formed as a part of the structural frame 200 of each of the first and second container sections 16, 18. By contrast, the spring latch 264 is affixed to, formed with, or otherwise attached to the blocking frame 100. The spring latch 264 and latch receiver 266 are disposed at a height "H1" above the floor 12 so that the spring latch 264 extends into and engages with the latch receiver 266 when the first and/or second container sections 16, 18 are disposed maximally outwards and against the blocking frame 100.

The spring latch 264 consists primarily of a latch mount 270, a latch tongue 272, and a latch handle 274 which is attached to the latch tongue 272 by a latch rod 275. In several aspects, the latch mount 270 is a box-like structure attached to or formed directly with a portion of the blocking frame 100. The latch mount 270 defines a cavity through which the latch tongue 272 can at least partially linearly reciprocate. Additionally, the latch tongue 272 is biased towards a front of the cargo compartment and away from the latch mount 270 by a latch spring 276. The latch spring 276 may be any known variety of spring including mechanical, hydraulic, or pneumatic devices capable of producing a spring-force that biases the latch mount 270 as described above. The latch handle 274 is sized and shaped to be manually manipulated by a person or machine. Accordingly, while the latch handle 274 shown in FIGS. 11A and 11B defines a "T-handle", it should be appreciated that any other shape of latch handle 274 may be used without departing from the scope or intent of the present disclosure. In a further example, the latch handle 274 shown in FIG. 11C extends orthogonally from the latch rod 275. The latch handle 274 of FIG. 11C extends through an aperture or slot 277 formed in a longitudinal portion of the latch mount 270. The latch handle 274 shown in FIG. 11C extends laterally towards a centerline of the cargo compartment. However, it should be appreciated that the latch handle 274 may be oriented in other directions, such as protruding through a longitudinally-extending slot 277 formed in a top surface of the latch mount 270 a bottom surface of the latch mount 270, or the like without departing from the scope or intent of the present disclosure. The latch handle 274 provides a means by which the latch tongue 272 may be retracted against the latch spring 276 and at least partially into the latch mount 270.

The latch receiver 266 defines structurally rigid portion of the structural frame 200 of each of the first and second container sections 16, 18. More specifically, the latch receiver 266 is a partial box section formed of structural material such as metals, alloys, plastics, vinyls, composite materials, or the like. The partial box section is defined by at least one curved portion 278 that faces inward relative to the exterior of the structural frame 200 and a flat portion 280. The curved portion 278 reduces or substantially eliminates any potential for interference with or damage to cargo stored within the first and second container sections 16, 18. That is, the curved portion 278 is sized and shaped to protrude as little as possible into the storage volume of each of the first and second container sections 16, 18. The flat portion 280 abuts the curved portion 278 and in some examples is formed by a portion of the vertical portions 204, 204' of the structural frame 200.

Figure 11C:
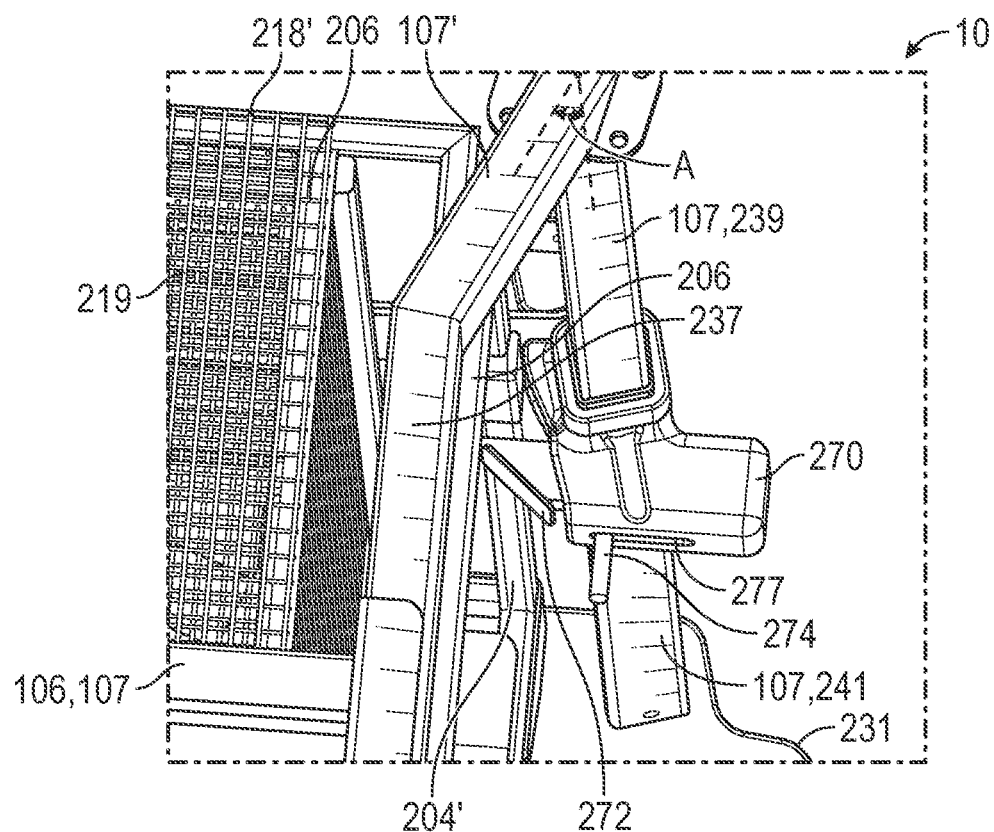
FIG. 11C is a partial perspective rear view of a portion of the modular portable storage container system depicting an alternate latch mechanism according to an aspect of the present disclosure.

Turning specifically to FIG. 11C, and with continuing reference to FIGS. 1-11B, the blocking frame 100 is shown in further detail proximate the spring latch 264. In some examples, the blocking frame 100 may be constructed such that one or more of the interlocking frame segments 107 is connected at an angle "A" to the other interlocking frame segments 107. That is, the interlocking frame segment 107 to which the spring latch 264 is affixed is mounted at an angle "A" other than precisely perpendicular or precisely parallel to the other interlocking frame segments 107 of the blocking frame 100. In examples in which the spring latch 264 is affixed to an interlocking frame segment 107 that is rotated at an angle "A" other than perpendicular or parallel to other interlocking frame segments 107 of the blocking frame 100, the blocking frame 100 provides rotational clearance for the first and second container sections 16, 18 as the first and second container sections 16, 18 are maneuvered within and locked to the blocking frame 100. In several examples, the interlocking frame segment 107 to which the spring latch 264 is mounted may be rotated by between about 0° and about 45° in relation to the other interlocking frame segments 107; or between about 5° and about 30° relative to the other interlocking frame segments 107; or at about 15° relative to the other interlocking frame segments 107. In the example shown in FIG. 11C, the angle "A" of rotation is about 15° relative to the other interlocking frame segments 107. Furthermore, as shown in FIG. 11C, one or more portions of the blocking frame 100 include angled interlocking frame segments 107' which are shaped and sized to accommodate the rotated interlocking frame segments 107 discussed above.

Figure 12A:
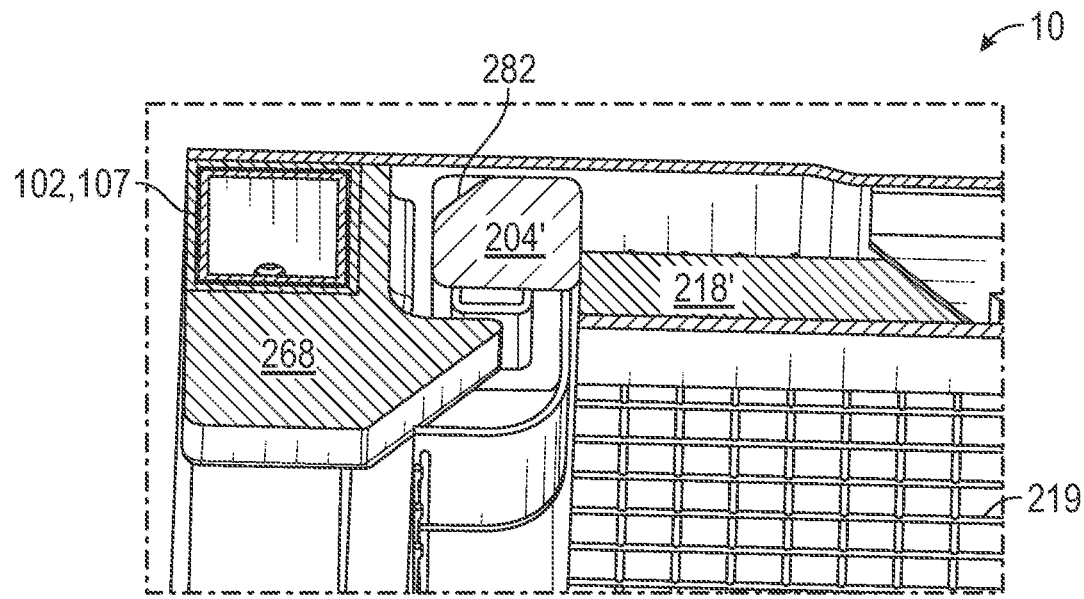
FIG. 12A is a partial perspective cross-sectional view of the modular portable storage container system of FIG. 9A depicting a retaining hook according to an aspect of the present disclosure.
Figure 12B:
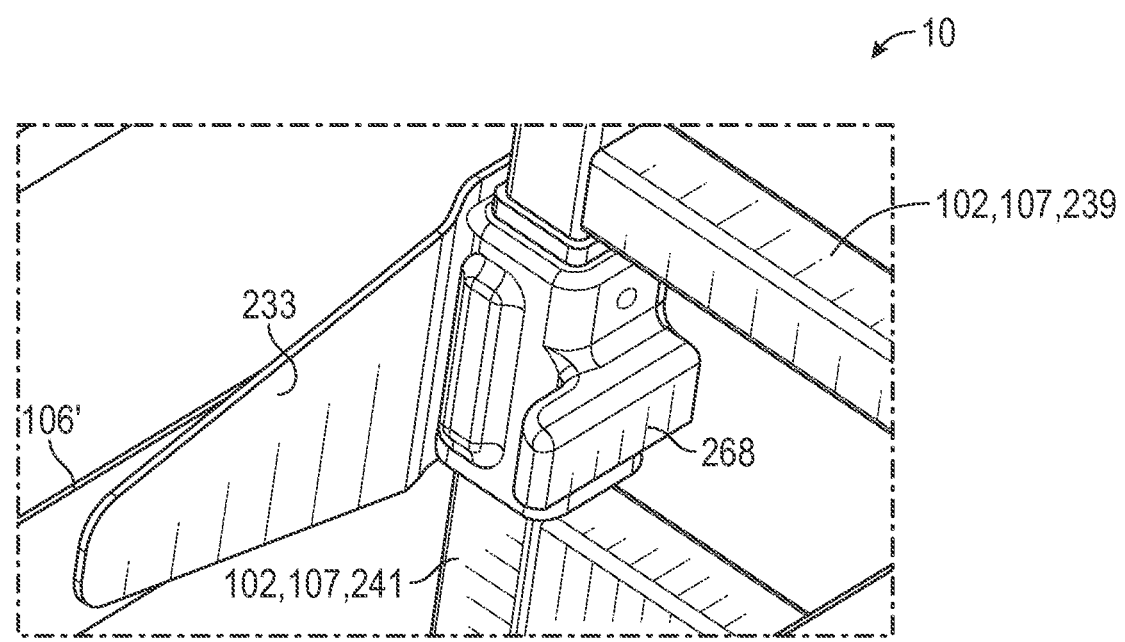
FIG. 12B is a partial perspective top view of a portion of the modular portable storage container system of FIG. 9B depicting a retaining hook according to an aspect of the present disclosure.

Referring now to FIGS. 12A and 12B, and with continuing reference to FIGS. 1-110, the outer vertical members 204' of the structural frame 200 have a cross sectional shape adapted to allow the structural frame 200 to be maneuvered freely into and out of the blocking frame 100 when the latch mechanism 262 is disengaged. More specifically, the outer vertical members 204' have a cross sectional shape that is substantially a box section with a beveled corner 282. The beveled corner 282 allows some rotational movement of the outer vertical members 204' within the retaining hook 268 and/or within or relative to the latch mechanism 262. In several aspects, the first and/or second container sections 16, 18 may be moved into the cargo compartment as described below.

First, one of the first and/or second container sections 16, 18 is rolled in a longitudinal direction through the narrow door frame 110 and into the vehicle cargo compartment. The first and/or second container section 16, 18 is then maneuvered to the appropriate side of the cargo compartment within the blocking frame 100. That is, the open side 24 of the first container section 16 and the open side 24' of the second container section 18 are intended to face inwards towards a centerline of the cargo compartment when the first and second container sections 16, 18 are in place in the blocking frame 100. More specifically, the front end 42 of the first container section 16 is rotated slightly and pushed forward towards the front frame portion 102 where the vertical portion 204' disposed at the outer front portion of the structural frame 200 is received by the retaining hook 268.

Like the latch mount 270, the retaining hook 268 is a structurally-rigid component rigidly affixed to, formed with, or otherwise attached to the blocking frame 100. The retaining hook 268 is sized and shaped to fit around and accept the vertical portion 204' such that the vertical portion 204' cannot move laterally inward or outward when the structural frame 200 and the blocking frame 100 are parallel to one another. However, the retaining hook 268 does allow rotation of the vertical portion 204' so that the structural frame 200 of each of the first and second container sections 16, 18 may be rotated and subsequently moved into and/or out of the cargo compartment. Once the retaining hook 268 at least partially receives the vertical portion 204' as described above, the first container section 16 may be rotated towards and eventually up against and parallel to the blocking frame 100. As the first container section 16 is rotated towards the blocking frame 100, the vertical portion 204' disposed at the outer rear portion of the structural frame 200 encounters the latch tongue 272. As the first container section 16 is rotated past the point at which the vertical portion 204' encounters the latch tongue 272, the latch tongue 272 is forced against the latch spring 276 and away from the vertical portion 204'. Once the vertical portion 204' has passed by the latch tongue 272 and the latch tongue 272 is no longer in physical contact with the vertical portion 204', the latch spring 276 pushes the latch tongue 272 inwards and into the latch receiver 266 thereby retaining the first container section 16 in place against the blocking frame 100. Accordingly, when the latch tongue 272 is engaged in the latch receiver 266 and the retaining hook 268 is engaged with and retaining the vertical portion 204' at the outer front of the first container section 16, the first container section 16 is immovably secured in place against the blocking frame 100.

In order to remove the structural frame 200 of either the first or second container sections 16, 18 from their respective immovably secured positions against the blocking frame 100, the latch handle 274 may be grasped by a user and pulled outwardly, i.e. toward a back of the cargo compartment or a back of the vehicle, thereby overcoming the latch spring 276 and retracting the latch tongue 272 from the latch receiver 266 and into the latch mount 270. Once the latch tongue 272 has been so retracted from the latch receiver 266, the structural frame 200 may be rotated away from the blocking frame 100 and then withdrawn from the retaining hook 268 in substantially the reverse of the process to insert the structural frame 200 in the blocking frame 100 as described hereinabove.

While the above description of the latch mechanism 262, retaining hook 268 and the like has been made with reference to the first container section 16, it should be appreciated that the same procedure and structures may be used with the second container section 18 on the opposite side of the blocking frame 100 from the first container section 16, or with additional blocking frames 100, structural frames 200 and the like without departing from the scope or intent of the present disclosure.

Figure 13:
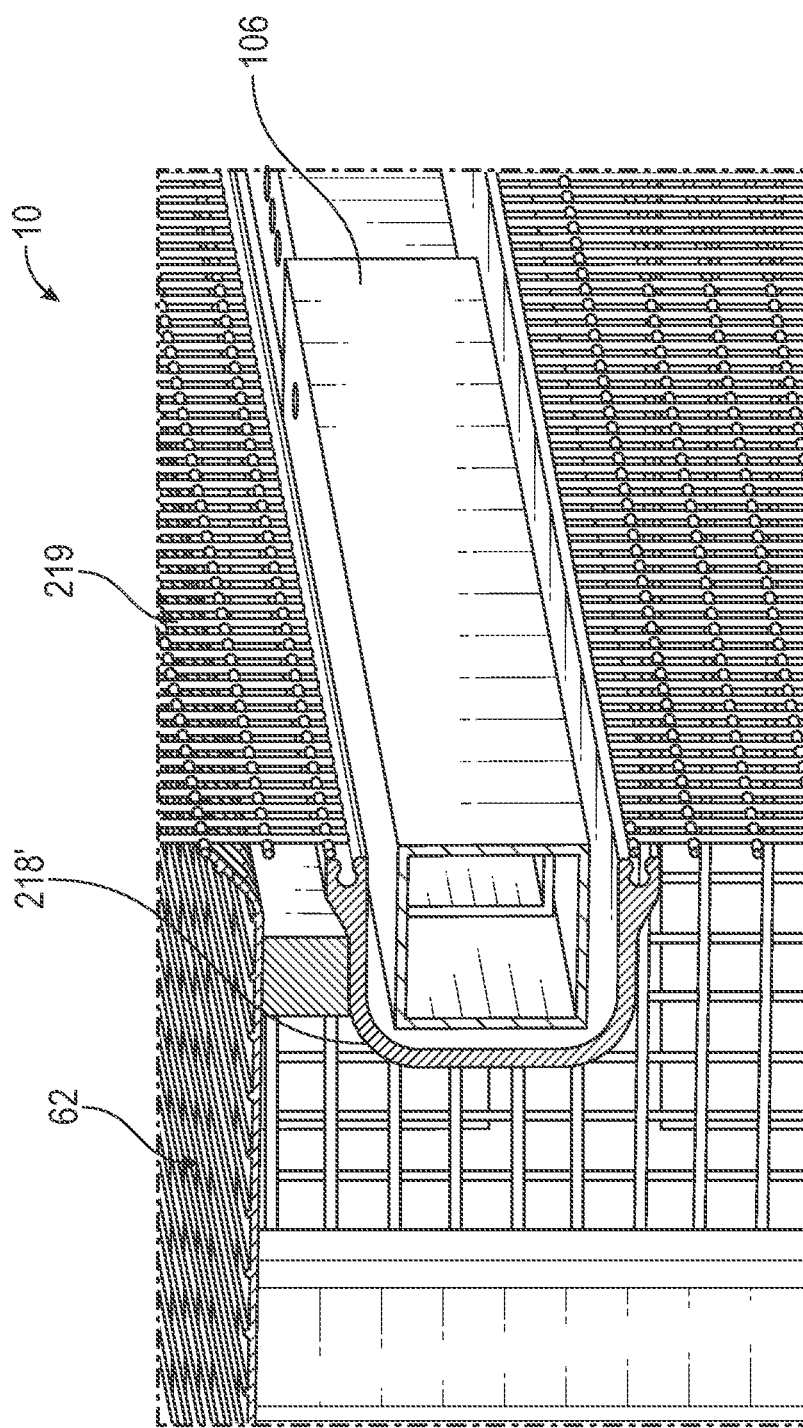
FIG. 13 is a partial perspective cross-sectional view of a portion of a blocking frame and a portion of a structural frame of a modular portable storage container system according to an aspect of the present disclosure.

Turning now to FIG. 13, and with continuing reference to FIGS. 1-12B, an enlarged partial cross-sectional view of a portion of the blocking frame 100 and a portion of the structural frame 200 is shown in further detail. In particular, FIG. 13 depicts one of the longitudinal bars 106 of the blocking frame 100. The longitudinal bar 106 of the blocking frame may take a variety of forms, but in the example shown has a substantially rectilinear cross section. FIG. 13 also depicts one of the longitudinal members 212 of the structural frame 200. In some aspects, the longitudinal member 212 may be one of the longitudinal structural members 218' which faces away from the centerline of the cargo compartment when the structural frame 200 is stored fully within the blocking frame 100. In several aspects, the longitudinal member 212 of the structural frame 200 has a cross sectional shape defining a "C" or "U"-shaped channel sized and shaped to engage with and fit closely around the longitudinal bar 106 of the blocking frame 100. The "C" or "U"-shaped cross-sectional shape of the longitudinal member 212 provides rigid structure to the structural frame 200 as well as to the shelves 62 defined therein while also allowing the structural frame 200 to nest tightly against the blocking frame 100, thereby maximizing storage space within each of the first and second container sections 16, 18.

Figure 14:
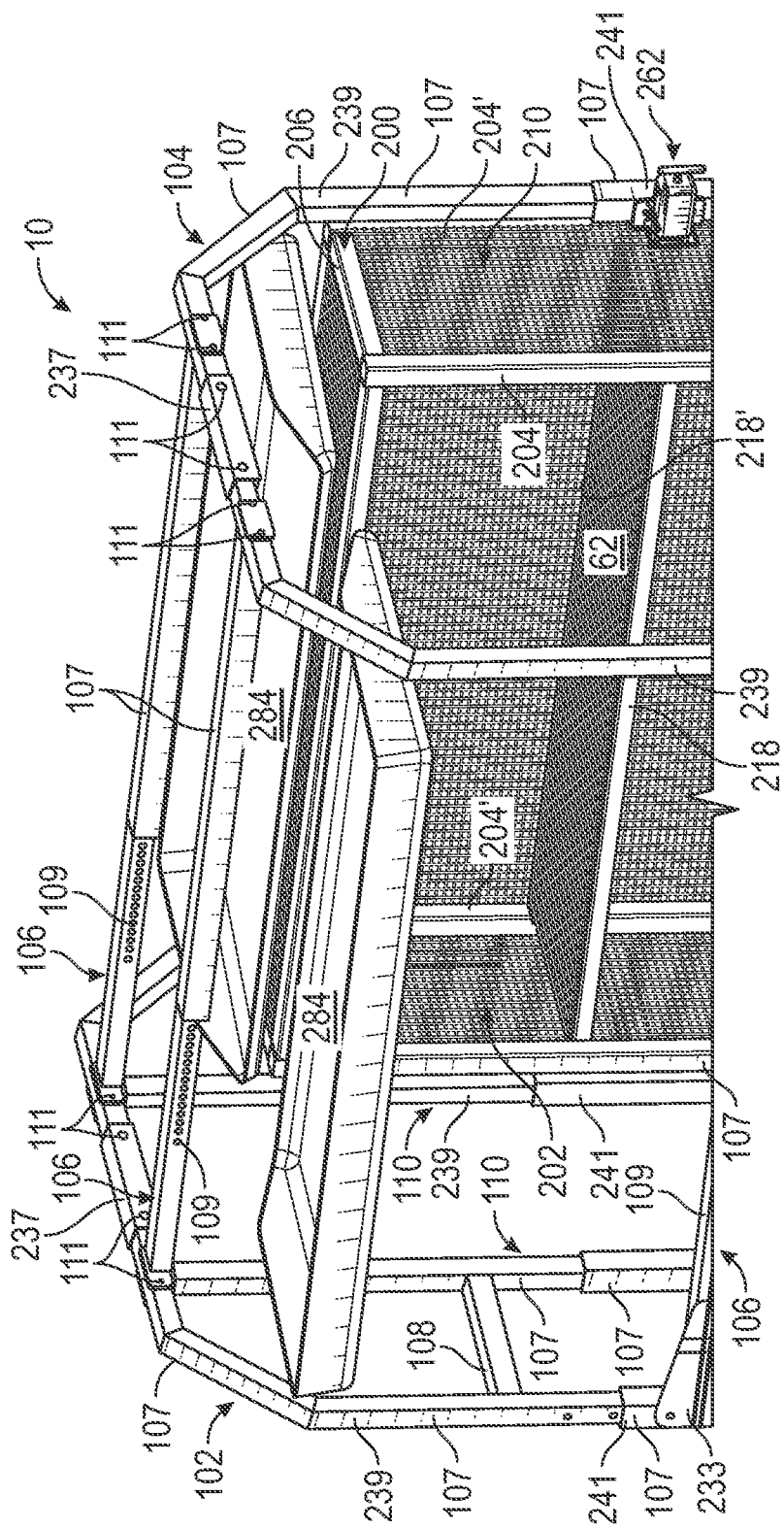
FIG. 14 is a partial perspective view of a modular portable storage container system having blocking frame mounted shelves according to an aspect of the present disclosure.

Turning now to FIG. 14, and with continuing reference to FIGS. 1-13, a further example of the blocking frame 100 is shown. The blocking frame 100 of some examples may be equipped with one or more overhead shelves 284. The overhead shelves 284 may be made of any of a variety of materials including metal, metal alloys, plastic, or the like. In some examples, the overhead shelves 284 may be vacuum formed, 3D printed, molded, sand-cast, lost-foam molded, welded or otherwise constructed from multiple separate parts, or the like. The overhead shelves 284 are attached to the blocking frame 100 any of a wide variety of known means including but not limited to: mechanical fasteners such as bolts, nuts, rivets, screws, interference fittings, and the like, and/or thermal or chemical fastening means such as welding, braising, glues, or the like. The overhead shelves 284 may be selectively removable or separable from the blocking frame 100 or integrally formed therewith.

A modular portable storage container system 10 of the present disclosure offers several advantages. In particular, the modularity of the storage container system 10 allows for use in a wide variety of different industrial, warehouse and private applications with relatively low cost of manufacturing and ease of scaling for different uses. Moreover, the modular portable storage container system 10 improves transit efficiency by providing a means for loading storage containers 14, warehousing the storage containers 14, moving the storage containers 14 into delivery and/or work or private vehicles, opening and securing the storage containers 14 within the cargo compartments of the vehicles with low effort and high portability, thereby increasing work efficiency for system 10 users.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A modular portable storage container system comprising:
    a first container section defining a first partial volume of storage space;
    a second container section defining a second partial volume of storage space, each of the first and second container sections having a structural frame;
    a blocking frame, the blocking frame sized and shaped to fit within a vehicle cargo compartment;
    a latch mechanism selectively retaining the structural frame of each of the first container section and the second container section in contact with the blocking frame;
    a brake mechanism affixed to each of the first container section and the second container section, wherein the brake mechanism further comprises:
    a brake pedal;
    a brake pivot shaft, the brake pedal fixedly mounted to the brake pivot shaft via a receiving aperture, each of the brake pivot shaft and the receiving aperture having corresponding keyed features preventing rotation of the brake pivot shaft relative to the brake pedal, the brake pivot shaft rotatably disposed through a portion of the first container section and the second container section;
    a sleeve rigidly affixed to each of the first container section and the second container section, the sleeve being vertically oriented, offset, and orthogonal to the brake pivot shaft; and
    an actuator rod slidably retained within the sleeve, the actuator rod extending from a rod pin to a brake pad, the rod pin slidably and rotatably disposed within an aperture in the brake pedal, and the brake pad extending in a downward direction,
    wherein the brake pedal is selectively actuatable between an engaged position and a disengaged position, wherein in the engaged position, the brake pedal rotates about the brake pivot shaft such that the actuator rod moves downward through the sleeve and the brake pad fixedly engages with the floor on which each of the first container section and the second container section rests, wherein the brake mechanism is selectively engageable to prevent movement of the structural frame of each of the first container section and the second container section relative to a floor on which each of the first container section and the second container section rests; and
    a plurality of casters affixed to a bottom surface of each of the first and second container sections, the plurality of casters allowing the first and second container sections to roll over the floor.

2. The modular portable storage container system of claim 1 wherein the brake mechanism further comprises:
    an aperture formed through the sleeve and facing inwardly towards the first container section and the second container section;
    a detent formed in the actuator rod and selectively alignable with the aperture in the sleeve; and
    a spring-loaded retainer having a rod-shaped element and a retainer spring, the spring-loaded retainer fixedly positioned on each of the first container section and the second container section and extending horizontally towards and passing through the aperture to selectively engage with the detent, wherein the retainer spring biases the rod-shaped element towards the aperture in the sleeve so that when the brake pedal is in the engaged position, the rod-shaped element engages with the detent and prevents vertical movement of the actuator rod within the sleeve.

3. The modular portable storage container system of claim 1 wherein the first and second container sections are movable between at least an unlatched position and a latched position, wherein in the unlatched position, the first and second container sections are freely movable relative to the blocking frame and in the latched position the structural frames of each of the first and second container sections are retained in contact with the blocking frame via the latch mechanism.

4. The modular portable storage container of claim 3 wherein the blocking frame further comprises:
a front frame portion;
a rear frame portion connected to the front frame portion by a plurality of longitudinal bars having a substantially planar and corrugated cross-sectional shape; and
one or more blocking members forming a narrow door frame in the front frame portion, the one or more blocking members preventing longitudinal movement of the first and second container sections within a vehicle while allowing a user to pass into a space between the first and second container sections when the first and second container sections are in the latched position;
a mounting plate selectively rigidly connecting the blocking frame to the floor; and
wherein one or more of the longitudinal bars is connected to the front frame portion and the rear frame portion by a connector plate, and wherein the rear frame portion defines a wide door frame, the wide door frame being larger than the narrow door frame, the wide door frame being sized to allow passage of the first and second container sections when the first and second container sections are in the unlatched position, and wherein the rear frame portion prevents longitudinal movement of the first and second container sections within a vehicle when the first and second containers sections are in the latched position.

5. The modular portable storage container system of claim 4 wherein at least a portion of the blocking frame is rotated at an angle of between about 5° and about 30° relative to other portions of the blocking frame to improve clearance between the first and second container sections and the blocking frame during movement of the first and second container sections.

6. The modular portable storage container system of claim 4 wherein the structural frame of each of the first and second container sections further comprises:
a front section; and
a rear section connected to the front section by one or more longitudinal members, wherein when the first and second container sections are in the latched position, the front section and the rear section nest within and substantially against the front frame portion and the rear frame portion, respectively, and wherein the longitudinal members have cross sectional shape that defines a channel sized to fit around and engage with the longitudinal bars of the blocking frame.

7. The modular portable storage container system of claim 4 wherein the latch mechanism further comprises:
a spring latch;
a latch receiver; and
a retaining hook, wherein one of the spring latch and the latch receiver is disposed on the blocking frame while the other of the spring latch and the latch receiver is disposed on the structural frames of each of the first container section and/or the second container section such that the spring latch and the latch receiver are disposed opposite one another and engage with one another when the first container section and/or the second container section are in the latched position, and wherein the hook engages with an outer vertical member of the structural frame to partially rotatably retain the structural frame.

8. The modular portable storage container system of claim 7 wherein the spring latch further comprises:
a latch mount rigidly disposed on the blocking frame;
a latch tongue;
a latch handle;
a latch rod extending from the latch tongue to the latch handle; and
a latch spring disposed within the latch mount and biasing the latch tongue inwardly towards the first container section and the second container section, wherein the latch handle is adapted to be grasped by a user's hand and selectively manipulated to retract the latch rod against the latch spring, thereby retracting the latch tongue into the latch mount.

9. The modular portable storage container system of claim 7 wherein the retaining hook is rigidly disposed on the blocking frame longitudinally opposite the spring latch, wherein when retaining hook engages with and retains the outer vertical member of the structural frame and the spring latch is engaged with the latch receiver, the structural frame is immobilized and held rigidly within the blocking frame in an orientation substantially parallel to an orientation of the blocking frame.

10. A modular portable storage container system comprising:
a first container section defining a first partial volume of storage space;
a second container section defining a second partial volume of storage space, each of the first and second container sections having a structural frame;
a blocking frame, the blocking frame sized and shaped to fit within a vehicle cargo compartment;
a latch mechanism selectively retaining the structural frame of each of the first container section and the second container section in contact with the blocking frame; and
a brake mechanism affixed to each of the first container section and the second container section, the brake mechanism having:
a brake pedal;
a brake pivot shaft, the brake pedal fixedly mounted to the brake pivot shaft via a receiving aperture, each of the brake pivot shaft and the receiving aperture having corresponding keyed features preventing rotation of the brake pivot shaft relative to the brake pedal, the brake pivot shaft rotatably disposed through a portion of the first container section and the second container section;
a sleeve rigidly affixed to each of the first container section and the second container section, the sleeve being vertically oriented, offset, and orthogonal to the brake pivot shaft; and
an actuator rod slidably retained within the sleeve, the actuator rod extending from a rod pin to a brake pad, the rod pin slidably and rotatably disposed within an aperture in the brake pedal, and the brake pad extending in a downward direction;

an aperture formed through the sleeve and facing inwardly towards the first container section and the second container section;

a detent formed in the actuator rod and selectively alignable with the aperture in the sleeve; and a spring-loaded retainer having a rod-shaped element and a retainer spring, the spring-loaded retainer fixedly positioned on each of the first container section and the second container section and extending horizontally towards and passing through the aperture to selectively engage with the detent, wherein the retainer spring biases the rod-shaped element towards the aperture in the sleeve so that when the brake pedal is in an engaged position, the rod-shaped element engages with the detent and prevents vertical movement of the actuator rod within the sleeve, wherein the brake pedal is selectively actuatable between the engaged position and a disengaged position, wherein in the engaged position, the brake pedal rotates about the brake pivot shaft such that the actuator rod moves downward through the sleeve and the brake pad fixedly engages with a floor on which each of the first container section and the second container section rests thereby preventing movement of the structural frame of each of the first and second container sections relative to the floor.

11. The modular portable storage container system of claim 10 wherein the first and second container sections are movable between at least an unlatched position and a latched position, wherein in the unlatched position, the first and second container sections are freely movable relative to the blocking frame and in the latched position the structural frame of each of the first and second container sections are retained in contact with the blocking frame via the latch mechanism.

12. The modular portable storage container of claim 11 wherein the blocking frame further comprises:
a front frame portion;
a rear frame portion connected to the front frame portion by a plurality of longitudinal bars having a planar and corrugated cross-sectional shape; and
one or more blocking members forming a narrow door frame in the front frame portion, the one or more blocking members preventing longitudinal movement of the first and second container sections within a vehicle while allowing a user to pass into a space between the first and second container sections when the first and second container sections are in the latched position, and
a mounting plate selectively rigidly connecting the blocking frame to the floor;
wherein one or more of the longitudinal bars is connected to the front frame portion and the rear frame portion by a connector plate, wherein the rear frame portion defines a wide door frame, the wide door frame being larger than the narrow door frame, the wide door frame being sized to allow passage of the first and second container sections when the first and second container sections are in the unlatched position, and wherein the rear frame portion prevents longitudinal movement of the first and second container sections within a vehicle when the first and second containers sections are in the latched position, and wherein at least a portion of the blocking frame is rotated at an angle of between about 5° and about 30° relative to other portions of the blocking frame to improve clearance between the first and second container sections and the blocking frame during movement of the first and second container sections.

13. The modular portable storage container system of claim 12 wherein the structural frame of each of the first and second container sections further comprises:
a front section; and
a rear section connected to the front section by one or more longitudinal members, wherein when the first and second container sections are in the latched position, the front section and the rear section nest within and substantially against the front frame portion and the rear frame portion, respectively, and wherein the longitudinal members have cross sectional shape that defines a channel sized to fit around and engage with the longitudinal bars of the blocking frame.

14. The modular portable storage container system of claim 10 wherein the latch mechanism further comprises:
a spring latch;
a latch receiver; and
a retaining hook, wherein one of the spring latch and the latch receiver is disposed on the blocking frame while the other of the spring latch and the latch receiver is disposed on the structural frames of each of the first container section and/or the second container section such that the spring latch and the latch receiver are disposed opposite one another and engage with one another when the first container section and/or the second container section are in the latched position, and wherein the hook engages with an outer vertical member of the structural frame to partially rotatably retain the structural frame.

15. The modular portable storage container system of claim 14 wherein the spring latch further comprises:
a latch mount rigidly disposed on the blocking frame;
a latch tongue;
a latch handle;
a latch rod extending from the latch tongue to the latch handle; and
a latch spring disposed within the latch mount and biasing the latch tongue inwardly towards the first container section and the second container section, wherein the latch handle is adapted to be grasped by a user's hand and selectively manipulated to retract the latch rod against the latch spring, thereby retracting the latch tongue into the latch mount.

16. The modular portable storage container system of claim 14 wherein the retaining hook is rigidly disposed on the blocking frame longitudinally opposite the spring latch, wherein when retaining hook engages with and retains the outer vertical member of the structural frame and the spring latch is engaged with the latch receiver, the structural frame is immobilized and held rigidly within the blocking frame in an orientation substantially parallel to an orientation of the blocking frame.

17. The modular portable storage container system of claim 10 further comprising:
a plurality of casters affixed to a bottom surface of each of the first and second container sections, the plurality of casters allowing the first and second container sections to roll over the floor.

18. A modular portable storage container system comprising:
a first container section defining a first partial volume of storage space;

a second container section defining a second partial volume of storage space, each of the first and second container sections having a structural frame;

a blocking frame, the blocking frame sized and shaped to fit within a vehicle cargo compartment, wherein the blocking frame further comprises:

a front frame portion;

a rear frame portion connected to the front frame portion by a plurality of longitudinal bars having a planar and corrugated cross-sectional shape; and one or more blocking members forming a narrow door frame in the front frame portion, the one or more blocking members preventing longitudinal movement of the first and second container sections within a vehicle while allowing a user to pass into a space between the first and second container sections when the first and second container sections are in a latched position, and a mounting plate selectively rigidly connecting the blocking frame to the floor; and wherein one or more of the longitudinal bars is connected to the front frame portion and the rear frame portion by a connector plate, wherein the rear frame portion defines a wide door frame, the wide door frame being larger than the narrow door frame, the wide door frame being sized to allow passage of the first and second container sections when the first and second container sections are in an unlatched position, and wherein the rear frame portion prevents longitudinal movement of the first and second container sections within a vehicle when the first and second containers sections are in the latched position; and wherein the structural frame of each of the first and second container sections further comprises:

a front section; and a rear section connected to the front section by one or more longitudinal members, wherein when the first and second container sections are in the latched position, the front section and the rear section nest within and substantially against the front frame portion and the rear frame portion, respectively, and wherein the longitudinal members have cross sectional shape that defines a channel sized to fit around and engage with the longitudinal bars of the blocking frame, and wherein at least a portion of the blocking frame is rotated at an angle of between about 5° and about 30° relative to other portions of the blocking frame to improve clearance between the first and second container sections and the blocking frame during movement of the first and second container sections;

a latch mechanism selectively retaining the structural frame of each of the first container section and the second container section in contact with the blocking frame, the latch mechanism including:

a spring latch having:

a latch mount rigidly disposed on the blocking frame;

a latch tongue;

a latch handle;

a latch rod extending from the latch tongue to the latch handle; and a latch spring disposed within the latch mount and biasing the latch tongue inwardly towards the first container section and the second container section, wherein the latch handle is adapted to be grasped by a user's hand and selectively manipulated to retract the latch rod against the latch spring, thereby retracting the latch tongue into the latch mount;

a latch receiver, wherein one of the spring latch and the latch receiver is disposed on the blocking frame while the other of the spring latch and the latch receiver is disposed on the structural frames of each of the first container section and/or the second container section such that the spring latch and the latch receiver are disposed opposite one another and engage with one another when the first container section and/or the second container section are in the latched position; and a retaining hook, wherein the retaining hook is rigidly disposed on the blocking frame longitudinally opposite the spring latch and engages with an outer vertical member of the structural frame to partially rotatably retain the structural frame, and when retaining hook engages with and retains the outer vertical member of the structural frame and the spring latch is also engaged with the latch receiver, the structural frame is immobilized and held rigidly within the blocking frame in an orientation substantially parallel to an orientation of the blocking frame; and a brake mechanism affixed to each of the first container section and the second container section, the brake mechanism selectively engageable to prevent movement of the structural frame of each of the first container section and the second container section relative to a floor on which each of the first container section and the second container section rests.

19. The modular portable storage container system of claim 18 wherein the brake mechanism further comprises:

a brake pedal;

a brake pivot shaft, the brake pedal fixedly mounted to the brake pivot shaft via a receiving aperture, each of the brake pivot shaft and the receiving aperture having corresponding keyed features preventing rotation of the brake pivot shaft relative to the brake pedal, the brake pivot shaft rotatably disposed through a portion of the first container section and the second container section;

a sleeve rigidly affixed to each of the first container section and the second container section, the sleeve being vertically oriented, offset, and orthogonal to the brake pivot shaft;

an actuator rod slidably retained within the sleeve, the actuator rod extending from a rod pin to a brake pad, the rod pin slidably and rotatably disposed within an aperture in the brake pedal, and the brake pad extending in a downward direction; and an aperture formed through the sleeve and facing inwardly towards the first container section and the second container section;

a detent formed in the actuator rod and selectively alignable with the aperture in the sleeve; and a spring-loaded retainer having a rod-shaped element and a retainer spring, the spring-loaded retainer fixedly positioned on each of the first container section and the second container section and extending horizontally towards and passing through the aperture to selectively engage with the detent, wherein the retainer spring biases the rod-shaped element towards the aperture in the sleeve so that when the brake pedal is in the engaged position, the rod-shaped element engages with the detent and prevents vertical movement of the actuator rod within the sleeve, wherein the brake pedal is selectively actuatable between an engaged position and a disengaged position, wherein in the engaged position, the brake pedal rotates about the brake pivot shaft such that the actuator rod moves downward through the sleeve and the brake pad fixedly engages with the floor on which each of the first container section and the second container section rests.

\* \* \* \* \*